(12) United States Patent (10) Patent No.: US 7,369,480 B2
Ikenaka et al. (45) Date of Patent: May 6, 2008

(54) OPTICAL PICKUP DEVICE AND OPTICAL ELEMENT

(75) Inventors: Kiyono Ikenaka, Hachioji (JP); Mika Wachi, Hachioji (JP)

(73) Assignee: Konica Minolta Opto, Inc., Tokyo (JP)

( * ) Notice: Subject to any disclaimer, the term of this patent is extended or adjusted under 35 U.S.C. 154(b) by 557 days.

(21) Appl. No.: 11/108,750

(22) Filed: Apr. 19, 2005

(65) Prior Publication Data

US 2005/0237899 A1 Oct. 27, 2005

(30) Foreign Application Priority Data

Apr. 22, 2004 (JP) .............................. 2004-126519
Apr. 28, 2004 (JP) .............................. 2004-133543

(51) Int. Cl.
*G11B 7/135* (2006.01)
(52) U.S. Cl. .............................. 369/112.08; 369/112.13
(58) Field of Classification Search ...................... None
See application file for complete search history.

(56) References Cited

U.S. PATENT DOCUMENTS 5,223,978 A * 6/1993 Burkhart et al. ............ 359/569
5,225,928 A * 7/1993 Dugan ........................ 359/356
6,434,104 B2 * 8/2002 Asoma ................... 369/112.08
6,594,222 B2 * 7/2003 Maruyama .............. 369/112.26
6,728,172 B2 * 4/2004 Ikenaka et al. ........... 369/44.23

* cited by examiner

*Primary Examiner*—William Korzuch
*Assistant Examiner*—Peter Vincent Agustin
(74) *Attorney, Agent, or Firm*—Finnegan, Henderson, Farabow, Garrett & Dunner, L.L.P.

(57) ABSTRACT

An optical pickup device includes a light source emitting a light beam having a wavelength within a range of 390 nm to 420 nm and an optical element to perform recording and/or reproducing of information of an optical disk having a protective substrate thickness $d_1$ mm using the first light beam from the first light source, wherein the optical element is made of a mixed material produced by dispersing particles into a resin, a sign of a refractive index change $\Delta n_2/\Delta t$ of the particles owing to a temperature change is opposite to a sign of a refractive index change $\Delta n_1/\Delta t$ of the resin owing to a temperature change, or an absolute value of the refractive index change $\Delta n_2/\Delta t$ is smaller than an absolute value of the refractive index change $\Delta n_1/\Delta t$.

43 Claims, 7 Drawing Sheets

OPTICAL AXIS

OPTICAL AXIS

OPTICAL AXIS

OPTICAL AXIS

OPTICAL AXIS

OPTICAL AXIS

OPTICAL AXIS

OPTICAL AXIS

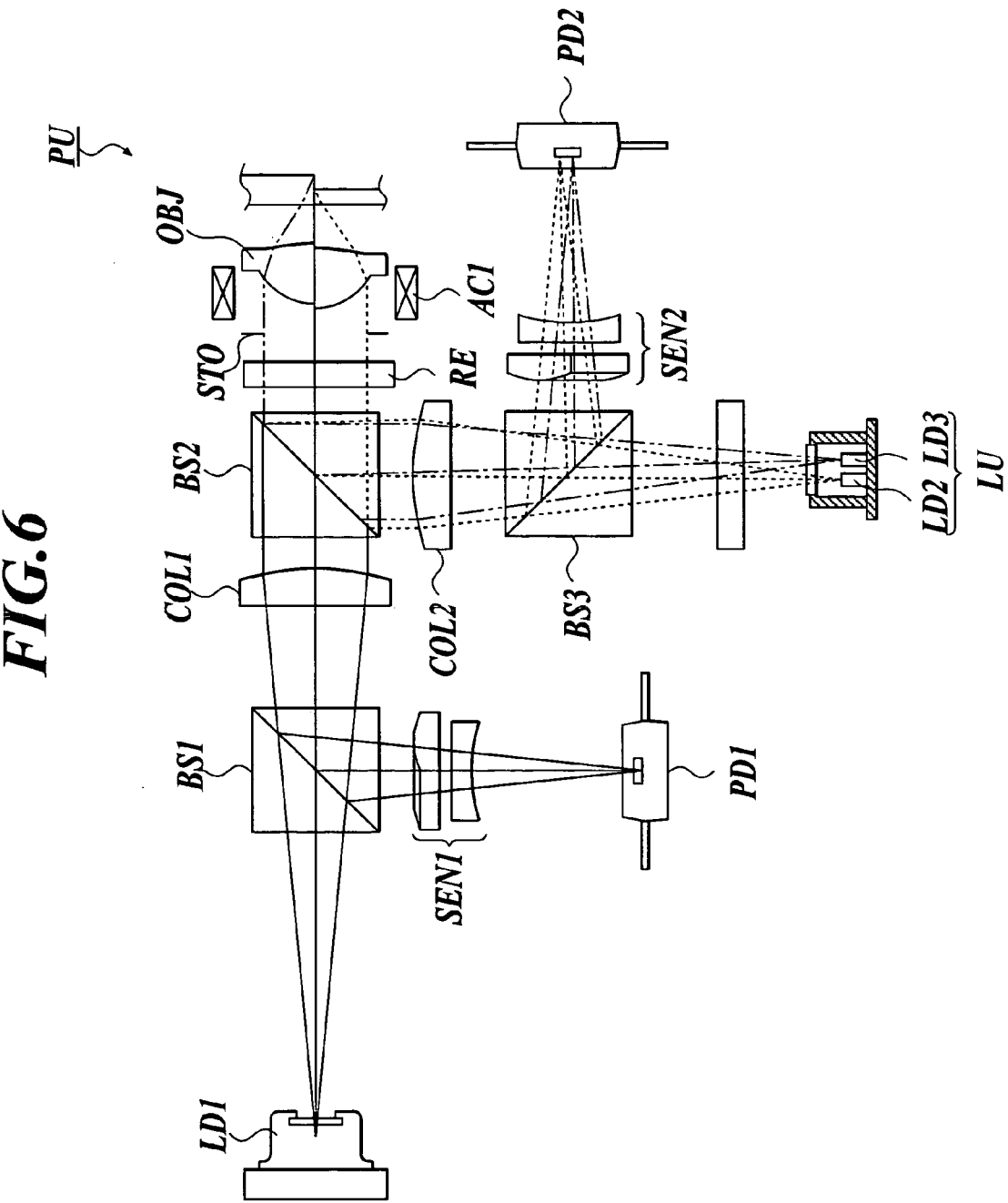

OPTICAL PICKUP DEVICE AND OPTICAL ELEMENT

BACKGROUND

1. Field of the Invention

The present invention relates to an optical pickup device and an optical element used for the optical pickup device.

2. Related Art

Recently, in an optical pickup device, the shortening of wavelength of a laser light source used as a light source for reproducing the information recorded on an optical disk or recording information on an optical disk has progressed. For example, a laser light source having a wavelength of 405 nm such as a blue-violet laser diode and a blue-violet SHG laser performing the wavelength conversion of an infrared laser diode using a second-harmonic generation is being put to practical use.

When these blue-violet laser light sources are used, 15 to 20 GB of information can be recorded on an optical disk having a diameter of 12 cm in case of using an objective having the same numerical aperture (NA) as that of a digital versatile disk (hereinafter simply referred to as a DVD). In the case where the NA of an objective is raised up to 0.85, it becomes possible to record the information of 23 GB to 27 GB on an optical disk having a diameter of 12 cm. Hereinafter, in the present specification, an optical disk and a magneto-optical disk which use a blue-violet laser light source are generically called as a "high density optical disk".

Now, two standards have been proposed as those of a high density optical disk until now. One is Blu-ray Disc (hereinafter simply referred to as BD) using an objective having an NA of 0.85 and having a protective layer of 0.1 mm in thickness, and the other is HD DVD (hereinafter simply referred to as HD) using an objective having an NA of 0.65 to 0.67 and having a protective layer of 0.6 mm in thickness. In consideration of the possibility of the distribution of high density optical disks in conformity with these two standards in the market in the future, an optical pickup device for compatibility with which also the recording and the reproducing of an existing DVD can be performed is important for both of the high density optical disks, and especially one-lens system which implements the compatibility with an objective is the most ideal form.

As for a compatible optical pickup device, as a correction method of spherical aberration caused by the differences in wavelengths of light beams to be used for a plurality of optical disks and in the thicknesses of protective substrates, a technique of changing the degree of the divergence of an incident light beam to an objective optical system, or of providing a diffractive structure on the optical surface of an optical element constituting an optical pickup device has been hitherto known.

Moreover, BD has a problem in which a chromatic aberration is produced when an instantaneous wavelength variation is generated since the focal depth of an objective is small owing to the smallness of the area of a spot converged on the information recording surface of BD and the resulting extreme height of the NA thereof in comparison the other recording media. Accordingly, a technique of making the characteristic of a lens to the variations of wavelengths (wavelength characteristic) by means of a diffractive structure has been known.

Moreover, an optical pickup device is configured by combining various optical elements such as an objective, a coupling lens and a beam expander, and these optical elements are frequently made of a plastic, which is light in weight and inexpensive in price. However, since a plastic has a feature in which the refractive index changes with temperature changes, for example, an objective made of a plastic has a problem in which a spherical aberration is generated in the over direction by a temperature rise.

Accordingly, a technique for offsetting the spherical aberration generated in the over direction owing to a temperature rise by providing a diffractive structure on the optical surface of an objective to generate the spherical aberration in an under direction by the diffractive structure in order to improve the characteristic of a lens to such a temperature change (temperature characteristic) is known.

As described above, the diffractive structure has been used for various uses such as compatibility achievement and the improvement of a wavelength characteristic and a temperature characteristic recently, and consequently a problem of the difficulty of a lens design which gives such a function only to the diffractive structure provided in an objective for example is produced. Accordingly, a technique for achieving the compatibility between two types of optical disks by providing a diffractive structure to an objective and also by providing a diffractive structure to a collimate lens formed separately form the objective to correct the chromatic aberration is known (see JP-Tokukai-2001-60336A).

However, even if the technique described in the JP-Tokukai-2001-60336A is used, the improvement of the above-mentioned temperature characteristic and the wavelength characteristic cannot be said to be sufficient, and technical means capable of improving the degree of freedom of a lens design is desired.

SUMMARY

It is an object of the present invention to provide an optical pickup device and an optical element, both capable of improving the wavelength characteristic and/or the temperature characteristic thereof.

Furthermore, it is another object of the present invention to provide an optical pickup device and an optical element, both having compatibility between at least two optical disks and being capable of improving the wavelength characteristic and/or the temperature characteristic thereof.

In the present specification, an optical disk having a protective film of about several to several tens nm in thickness on an information recording surface of the disk, and an optical disk including a protective layer or a protective film of zero in thickness are also included as the high density optical disk besides-the BD and the HD, both mentioned above.

In the present specification, DVD is the general term of the optical disks of DVD series such as DVD-ROM, DVD-Video, DVD-Audio, DVD-RAM, DVD–R, DVD–RW, DVD+R and DVD+RW, and CD is the general term of the optical disks of CD series such as CD-ROM, CD-Audio, CD-Video, CD-R and CD-RW.

In order to solve the above-mentioned subject, in accordance with the first aspect of the present invention, an optical pickup device of the present invention is an optical pickup device including a first light source emitting a first light beam having a wavelength $\lambda_1$ within a range of from 390 nm to 420 nm, both inclusive, and at least one optical element to perform recording and/or reproducing of information of a first optical disk having a protective substrate thickness $d_1$ mm using the first light beam from the first light source, wherein the optical element is made of a mixed material produced by dispersing particles into a resin, a sign of a refractive index change $\Delta n_2/\Delta t$ of the particles owing to a temperature change is opposite to a sign of a refractive index change $\Delta n_1/\Delta t$ of the resin owing to a temperature change, or an absolute value of the refractive index change $\Delta n_2/\Delta t$ is smaller than an absolute value of the refractive index change $\Delta n_1/\Delta t$, and a spherical aberration $SA_1$ [λ rms] produced when an operating temperature of the optical pickup device rises by 30° C. satisfies a following relation, $$|(SA_1/\lambda_1^2)\cdot(\Delta n_3/\Delta t)\cdot NA^4\cdot 2d_1\cdot 10^9| \leq 9.9 \quad (1)$$

where $SA_1$ denotes a sum of squares of a third order spherical aberration, a fifth order spherical aberration and a seventh order spherical aberration, $\Delta n_3/\Delta t$ denotes the refractive index change owing to the temperature change of the mixed material, and NA denotes a numerical aperture on an exit side of an optical element located nearest to an optical disk side among optical elements which the optical pickup device contains.

In this case, it is preferable to satisfy the following relation of formula (2), $$|(\Delta n_1/\Delta t)| \geq 2\cdot|(\Delta n_3/\Delta t)| \quad (2)$$

Moreover, it is preferable that the sign of $\Delta n_{2A}/\Delta t$ is opposite to the sign of $\Delta n_1/\Delta t$.

According to such an optical pickup device, an optical element is made of a mixed material using a resin as a mother material and being produced by dispersing fine particles to the resin which fine particles have a refractive index change $(\Delta n_2/\Delta t)$, owing to a temperature change, the sign of which is opposite to the sign of a refractive index change $(\Delta n_1/\Delta t)$ owing to a temperature change of the resin, or the absolute value of which is smaller than the absolute value of the refractive index change $(\Delta n_1/\Delta t)$, and the optical pickup device is set in order that the spherical aberration $SA_1$ produced when an operating temperature of the optical pickup device rises by 30° C. may satisfy the above-mentioned formula (1), and consequently it is possible to correct the spherical aberration to a temperature change by suppressing the changed quantity of the refractive index to the temperature change. Thus, though the optical element is the single lens having a high NA, it is possible to make the optical element one the converging performance of which does not deteriorate even if the environmental temperature changes.

Incidentally, the present specification referrers to such a new optical material as an "athermal resin", which optical material has a reduced refractive index owing to a temperature change while holding the formability of a plastic material by mixing fine particles (for example, inorganic fine particles) into a resin (for example, a plastic material).

The refractive index change $(\Delta n_2/\Delta t)$ owing to a temperature change of the fine particles to be dispersed may not necessarily have an opposite sign to that of the mother material. Although what is necessary is just a value smaller than the refractive index change $(\Delta n_1/\Delta t)$ of the mother material owing to the temperature change, if the refractive index change $(\Delta n_2/\Delta t)$ is set to be so, in order to obtain the target mixed material, the fine particles must be disposed much, and then the formality of the optical pickup device becomes worse. Therefore, the refractive index change $\Delta n_2/\Delta t$ desirably has an opposite sign to that of the refractive index change $\Delta n_1/\Delta t$.

Moreover, if the optical element is one having a high NA (exit plane NA 0.6-0.9) to be used for the pickup optical system for an optical disk of a wavelength λ and having the spherical aberration $SA_1$ satisfying the formula (1), the optical element can perform recording and reproducing satisfactory in the optical disk of the NA.

Moreover, in case of using an objective having the NA of 0.65 for a HD, satisfying the formula $|(SA_1/\lambda_1^2)\cdot(\Delta n_3/\Delta t) \cdot NA^4\cdot 2d\cdot 10^9| \leq 4.0$ is preferable, and for example, in case of using an objective having an NA of 0.85 for a BD, satisfying the formula of $|(SA_1/\lambda_1^2)\cdot(\Delta n_3/\Delta t)\cdot NA^4\cdot 2d\cdot 10^9| \leq 9.9$ is preferable.

By using such an athermal resin as a material of an optical element, an advantage of making it possible to perform mass production of single lenses which does not require any separated correction element in spite of a lens having an NA of 0.85 by injection molding.

Here, the temperature change of the refractive index in the optical element of the present invention is described. The rate of change of a refractive index to a temperature change is expressed by A in the following formula 1 by differentiating a refractive index n by a temperature t based on the formula of Lorentz-Lorenz.

$$A = \frac{(n^2+2)(n^2-1)}{6n}\left\{(-3\alpha) + \frac{1}{[R]}\frac{\delta[R]}{\delta t}\right\} \quad [\text{Formula 1}]$$

where A: the rate of change of the refractive index of the optical element to a temperature change, n: the refractive index of the optical element, α: the linear expansion coefficient of the optical element, [R]: molecule refractive power of the optical element.

Since the contribution of the second term is smaller than the contribution of the first term in the formula 1 in the case of a general plastic material, the second term can be almost neglected. For example, in case of acrylic resin (PMMA), the linear expansion coefficient α is $7\times 10^{-5}$. When the linear expansion coefficient α is substituted in the above formula, it is obtained that $A=-12\times 10^{-5}$, which is almost in agreement with an actually measured value.

Here, in the optical element of the present invention, the contribution of the second term of the above formula is enlarged substantially to make the contribution be cancelled with a change owing to a linear expansion of the first term by dispersing, for example, the fine particles having diameters being 50 nm or less into a plastic material.

To put it concretely, it is preferable to suppress the refractive index change rate to a temperature change, which has been about $-12\times 10^{-5}$ earlier, to be $10\times 10^{-5}$ in an absolute value. More preferably, it is more preferable to suppress to be less than $8\times 10^{-5}$, or more preferably to be $6\times 10^{-5}$, for reducing the changes of the spherical aberration owing to temperature changes.

For example, the dependability of the refractive index change to such temperature changes can be resolved by dispersing the fine particles of niobium oxide ($Nb_2O_5$) into an acrylic resin (PMMA).

In the case where the refractive index change $\Delta n_3/\Delta t$ of the mixed material owing to a temperature change is 50% or less of the refractive index change $\Delta n_1/\Delta t$ of the resin as the mother material owing to a temperature change as the invention in case of satisfying the formula (2), it is possible to make the optical element to be the one in which the spherical aberration generated when a environmental temperature rises by 30° C. is corrected to be the Marechal limit 0.07 [λ rms] or less.

The rate of the plastic material as the mother material is about 80 to 20 of niobium oxide in the volume ratio, and they are mixed to be uniform. Although there is a problem in which fine particles are easily converged, a technique for giving electric charges to the particle surface to make the fine particles be dispersed is also known, and a required dispersed state can be produced.

Incidentally, in order to control the rate of the change of a refractive index to a temperature change, the volume ratio can be increased or decreased suitably, and it is also possible to blend a plurality of kinds of nano size inorganic particles to make them dispersed.

In the volume ratio, in the above-mentioned example, although it is 80:20, it can be adjusted suitably within a range from 90:10 to 60:40. When the volume ratio is smaller than 90:10, the effect of suppressing the refractive index change becomes small, and conversely, when the volume ratio exceeds 60:40, a problem arises in the formability of the athermal resin, and it is not preferable.

Moreover, the fine particles are preferably an oxide, and it is more preferably that the oxidation state is saturated and the fine particles are oxides which do not oxidize any more.

Moreover, it is preferably that the fine particles are an inorganic substance in order to suppress a reaction with the plastic material which is a high polymer organic compound to be low, and the deterioration of a transmission factor and the deterioration of wavefront aberration caused by a long term irradiation of a blue-violet laser can be protected by being an oxide. In particular, in a severe condition such that blue-violet laser is irradiated under a high temperature, oxidization becomes easy to be promoted. But, in case of such an inorganic oxide, the deterioration of the transmission factor and the deterioration of the wavefront aberration can be prevented.

Incidentally, in the case where the diameters of the fine particles to be dispersed in the plastic material are large, the dispersion of an incident light beam is easily generated, and the transmission factor of a converging lens falls. With regard to a high density optical disk, since the laser power at which the blue-violet laser diode to be used for the recording/reproducing of information can obtain a long term stable laser oscillation is about 30 mW, if the transmission factor of the optical element to the blue-violet laser power is low, it is disadvantage for raising the recording speed of information and for coping with a multi-layer disk. Accordingly, the diameter of the fine particles to be dispersed in the plastic material is preferably to be 20 nm or less, more preferably to be 10 nm to 15 nm or less, for preventing the lowering of the transmission factor of the converging lens.

Moreover, it is preferable that the average particle diameter of the fine particles in the mixed material is 50 nm or less.

If the average particle diameter of the fine particles exceeds 50 nm, a mixed material obtained becomes muddy, and transparency falls. Then, the optical transmission factor of the optical element becomes 70% or less. The average particle diameter is preferably 20 nm or less, more preferably 10 to 15 nm or less.

As the fine particles used in the present invention, for example, oxide fine particles can be cited. To put it more concretely, for example, there can be cited titanium oxide, zinc oxide, aluminum oxide, zirconium oxide, hafnium oxide, niobium oxide, tantalum oxide, magnesium oxide, calcium oxide, strontium oxide, barium oxide, yttrium oxide, lanthanum oxide, cerium oxide, indium oxide, tin oxide, lead oxide, double oxides consisting of these oxides such as lithium niobate, potassium niobate, lithium tantalate, and salts formed by being combined with these oxides such as phosphate and sulfate.

Moreover, as inorganic fine particles of the present invention, fine particles of semiconductor crystal composition can also be used preferably. Although there is especially no restriction in this semiconductor crystal composition, compositions which do not generate absorption, luminescence, fluorescence or the like in the wavelength area used as an optical element are preferable. As concrete examples of compositions, there can be cited simple substances of the $14^{th}$ group element in the periodic table such as carbon, silicon, germanium and tin, simple substances of the $15^{th}$ group element in the period table such as phosphorus (black phosphorus), simple substances of the $16^{th}$ group elements in the periodic table such as selenium and tellurium, compounds consisting of a plurality of the $14^{th}$ group elements in the periodic table such as silicon carbide (SiC), compounds consisting of the 14th group element in the periodic table and the $16^{th}$ group element in the periodic table such as tin oxide (IV) ($SnO_2$), tin sulfide (II, IV) (Sn(II) Sn(IV) $S_3$), tin sulfide (IV) ($SnS_2$), tin sulfide (II) (SnS), tin selenide (II) (SnSe), tin telluride (II) (SnTe), lead sulfide (II) (PbS) and lead selenide (II) (PbSe) and lead telluride (II) (PbTe), compounds of the $13^{th}$ group elements in the periodic table and the $15^{th}$ group elements in the periodic table (or III-V group compound semiconductors) such as boron nitride (BN), boron phosphide (BP), boron arsenide (BAs), aluminum nitride (AlN), aluminum phosphide (AlP), aluminum arsenide (AlAs), aluminum antimonide (AlSb), gallium nitride (GaN), gallium phosphide (GaP), gallium arsenide (GaAs), gallium antimonide (GaSb), indium nitride (InN), indium phosphide (InP), indium arsenide (InAs) and indium antimonide (InSb), compounds of the $13^{th}$ group elements of the periodic table and the $16^{th}$ group elements in the periodic table such as aluminum sulfide ($Al_2S_3$), aluminum selenide ($Al_2Se_3$), gallium sulfide ($Ga_2S_3$), gallium selenide ($Ga_2Se_3$), gallium telluride ($Ga_2Te_3$), indium oxide ($In_2O_3$), indium sulfide ($In_2S_3$), indium selenide ($In_2Se_3$) and indium telluride ($In2Te_3$), compounds of the $13^{th}$ group elements in the periodic table and the $17^{th}$ group elements in the periodic table such as thallium chloride (I) (TlCl) thallium bromide (I) (TlBr) and thallium iodide (I) (TlI), compounds of the $12^{th}$ group elements in the periodic table and the $16^{th}$ group elements in the periodic table (or II-VI group compound semiconductors) such as zinc oxide (ZnO), zinc sulfide (ZnS), zinc selenide (ZnSe), zinc telluride (ZnTe), cadmium oxide (CdO), cadmium sulfide (CdS), cadmium selenide (CdSe), cadmium telluride (CdTe), mercurial sulfide (HgS), mercury selenide (HgSe) and mercury telluride (HgTe), compounds of the $15^{th}$ group elements in the periodic table and the $16^{th}$ group elements in the periodic table such as arsenic sulfide (III) ($As_2S_3$), arsenic selenide (III) ($As_2Se_3$), arsenic telluride (III) ($As_2Te_3$), ammonium sulfide (III) ($Sb_2S_3$), antimonium selenide (III) ($Sb_2Se_3$), antimonium telluride (III) ($Sb_2Te_3$), bismuth sulfide (III) ($Bi_2S_3$), bismuth selenide (III) ($Bi_2Se_3$) and bismuth telluride (III) ($Bi_2Te_3$), compounds of the $11^{th}$ group elements in the periodic table and the $16^{th}$ group elements in the periodic table such as copper oxide (I) ($Cu_2O$) and copper selenide (I) ($Cu_2Se$), compounds of the $11^{th}$ group elements in the periodic table and the $17^{th}$ group elements in the periodic table such as copper chloride (I) (CuCl), copper bromide (I) (CuBr), copper iodide (I) (CuI), silver chloride (AgCl) and silver bromide (AgBr), compounds of the $10^{th}$ group elements in the periodic table and the $16^{th}$ group elements in the periodic table such as nickel oxide (II) (NiO), and the 16th group element of the periodic table, compounds of the $9^{th}$ group elements in the periodic table and the $16^{th}$ group elements in the periodic table such as cobalt oxide (II) (CoO)

and cobalt sulfide (II) (CoS), and the 16th group element of the periodic table, compounds of the $8^{th}$ group elements in the periodic table and the $16^{th}$ group elements in the periodic table such as triiron tetroxide ($Fe_3O_4$) and iron sulfide (II) (FeS), compounds of the $7^{th}$ group elements in the periodic table and of the $16^{th}$ group elements in the periodic table such as manganese oxide (II) (MnO), compounds of the $6^{th}$ group elements in the periodic table and of the $16^{th}$ group elements in the periodic table such as molybdenum sulfide (IV) ($MOS_2$) and tungstic oxide (IV) ($WO_2$), compounds of the $5^{th}$ group elements in the periodic table and the $16^{th}$ group elements in the periodic table such as vanadium oxide (II) (VO), vanadium oxide (IV) ($VO_2$) and tantalum oxide (V) ($Ta_2O_5$), compounds of the $4^{th}$ group elements in the periodic table and the $16^{th}$ group elements in the periodic table such as titanium oxide ($TiO_2$, $Ti_2O_5$, $Ti_2O_3$, $Ti_5O_9$ and the like), compounds of the $2^{nd}$ group elements in the periodic table and of the $16^{th}$ group elements in the periodic table such as magnesium sulfide (MgS) and magnesium selenide (MgSe), chalcogen spinels such as cadmium oxide (II) chromium (III) ($CdCr_2O_4$), cadmium selenide (II) chromium (III) ($CdCr_2Se_4$), copper sulfide (II) chromium (III) ($CuCr_2S_4$) and mercury selenide (II) chromium (III) ($HgCr_2Se_4$), barium titanate ($BaTiO_3$) and the like. Incidentally, semiconductor clusters the structures of which are defined such as (BN) 75 ($BF_2$) 15F15 reported by G. Schmid et al., Adv. Mater. vol. 4, p. 494 (1991), D. Fenske et al. and Cu146Se73 (triethyl phosphine) 22 reported by D. Fenske et al., Angew. Chem. Int. Ed. Engl., vol. 29, p. 1452 (1990) volumes are exemplified similarly.

One kind of inorganic fine particles may be used as these fine particles, and a plurality of kinds of inorganic fine particles may be used together.

Moreover, it is preferable that the optical element consists of a single lens.

In the earlier optical element made of a plastic, although there is a technique which adopts the configuration of using two lenses in order to correct spherical aberration at the time of the rise of an environmental temperature by 30° C., the cost rise owing to the assembly and the adjustment of the two lenses and the increase of the number of parts is not avoided. Moreover, as a pickup for a personal computer, it is desired to be light in weight and to be thin in shape. Accordingly, by configuring the optical element to have one lens, the problems of the two lens configuration can be solved, and the optical element can be formed to have a light and compact lens.

In accordance with the second aspect of the present invention, the optical pickup device of the present invention is an optical pickup device including a first light source emitting a first light beam having a wavelength $\lambda_1$ within a range of from 390 nm to 420 nm, both inclusive, and at least one optical element to perform recording and/or reproducing of information of a first optical disk having a protective substrate thickness $d_1$ mm using the first light beam from the first light source, wherein the optical element is made of a mixed material produced by dispersing particles into a resin, and a sign of a refractive index change $\Delta n_2/\Delta \lambda_1$ of the particles owing to a wavelength change is opposite to a refractive index change $\Delta n_1/\Delta \lambda_1$ of the resin owing to a wavelength change, or an absolute value of the refractive index change $\Delta n_2/\Delta \lambda_1$ is smaller than an absolute value of the refractive index change $\Delta n_1/\Delta \lambda_1$.

According to such an optical pickup device, the optical element is made of a mixed material which uses a resin as a mother material and is made by dispersing fine particles having a refractive index change ($\Delta n_2/\Delta \lambda_1$) owing to a wavelength change which refractive index change ($\Delta n_2/\Delta \lambda_1$) has a sign opposite to that of a refractive index change ($\Delta n_1/\Delta \lambda_1$) of the resin owing to a wavelength change, or the absolute value of which refractive index change ($\Delta n_2/\Delta \lambda_1$) is smaller than that of the refractive index change ($\Delta n_1/\Delta \lambda_1$), and thereby the changed quantity of the refractive index to the wavelength change can be suppressed. Consequently, the optical element can be made to one which corrects the spherical aberration well, even if the wavelength of a light source is shifted from a reference wavelength. Furthermore, though an objective is the single lens having a high NA, advantages such as the increase of the degree of freedom of lens design in comparison with the earlier objective, and the chromatic aberration of the objective can be reduced.

The refractive index change ($\Delta n_2/\Delta \lambda_1$) owing to a wavelength change of the fine particles to be dispersed may not necessarily be opposite to that of mother material. Although what is necessary is just a value smaller than the refractive index change ($\Delta n_1/\Delta \lambda_1$) owing to a wavelength change of mother material, if the refractive index change ($\Delta n_1/\Delta \lambda_1$) is set to be so, in order to obtain the mixed target material, much fine particles must be dispersed, and the formability becomes bad. Accordingly, the refractive index change ($\Delta n_2/\Delta \lambda_1$) preferably has an opposite sign to the refractive index change ($\Delta n_1/\Delta \lambda_1$).

In this case, it is preferable that an Abbe number $v_{d3}$ on a d line of the mixed material satisfies a following relation of formula (3), $$1.1 \cdot v_{d1} \leq v_{d3} \qquad (3)$$

where $v_{d1}$ denotes an Abbe number on the d line of the resin, $v_{d1}$ and $v_{d3}$ can be both obtained from $v_d=(n_d-1)/(n_F-n_c)$, $n_d$ denotes the refractive index of the resin on the d line, $n_F$ denotes a refractive index on an F line of the resin, and $n_c$ denotes a refractive index on a C line of the resin.

According to such an optical pickup device, if the Abbe number $v_{d3}$ on a d line of the mixed material is 1.1 or more times as compared with Abbe number $v_{d1}$ on the d line of the mother material, it is possible to correct the spherical aberration at the time when there is a shift from the reference wavelength to be the Marechal limit 0.077 [λ rms] or less by the dispersion reduction compared with earlier resin.

Moreover, it is preferable that a spherical aberration $SA_2$ [λ rms] produced when the wavelength of the first light beam from the first light source is changed by ±5 nm from $\lambda_1$ satisfies a following relation of formula (4), $$|(SA_2/\lambda_1^2) \cdot (\Delta n_3/\Delta \lambda_1) \cdot NA^4 \cdot 2d_1 \cdot 10^9| \leq 18.5 \qquad (4)$$

where $SA_2$ denotes a sum of squares of a third order spherical aberration, a fifth order spherical aberration and a seventh order spherical aberration, $\Delta n_3/\Delta \lambda_1$ denotes the refractive index change by the wavelength change of the mixed material, and NA denotes a numerical aperture on an exit side of an optical element located nearest to an optical disk side among optical elements which the optical pickup device contains.

By the way, it is known well that the spherical aberration becomes larger in proportion to the $4^{th}$ power of NA. Consequently, if the spherical aberration is $SA_2$ which satisfies the formula (4) like this invention even if it is the optical element having a high NA (exit side NA 0.6 to 0.9), in the optical disk of the NA, recording and reproducing can be performed satisfactory.

Moreover, for example, in case of using an objective having the NA of 0.65 for a HD, satisfying the formula $|(SA_2/\lambda_1^2) \cdot (\Delta n_3/\Delta \lambda_1) \cdot NA^4 \cdot 2d \cdot 10^9| \leq 7.8$ is preferable, and for example, in case of using an objective having an NA of 0.85 for a BD, satisfying the formula of $|(SA_2/\lambda_1^2) \cdot (\Delta n_3/\Delta \lambda_1) \cdot NA^4 \cdot 2d \cdot 10^9| \leq 18.5$ is preferable.

Moreover, a positionally changed minimum quantity of wavefront aberration Δfb [μm] in an optical axis direction of a converged spot formed on an information recording surface of the first optical disk when the wavelength of the first light beam from the first light source has changed from $\lambda_1$ by ±1 nm satisfies a following relation of formula (5), $$|\Delta fb/\Delta \lambda 1| \leq 0.4 \qquad (5).$$

According to such an optical pickup device, if the positionally changed minimum quantity of wavefront aberration Δfb (μm) of the optical axis direction in the converged spot formed on the information recording surface of the optical disk is the value satisfying the formula (5) when the wavelength λ has changed by ±1 nm in the optical element manufactured with a mixed material, even if the wavelength change by mode hop occurs, in the optical disk using the λ, recording and reproducing can be performed satisfactory. Furthermore, since the spherical aberration is it proportional to the 4th power of the NA in case of the optical element having an NA of 0.8 to 0.9, if emphasis is put on correcting the spherical aberration correspondingly to a temperature change, as compared with the optical element having an NA of about 0.65, the deterioration of the aberration at the time of a wavelength change becomes remarkable. Although it is difficult to make the Δfb small when the temperature characteristic and the wavelength characteristic are satisfied simultaneously. But in case of the Δfb satisfying the formula (5), it is possible to perform correction with a separated compensator such as a crystal liquid, and recording and reproducing can be performed satisfactory in the optical disk of the NA.

Moreover, it is preferable that following relations of formulas (6) and (7) are satisfied, $$n_1 < n_3 \qquad (6)$$

$$26.0° \leq \alpha \qquad (7)$$

where $n_1$ and $n_3$ denote refractive indicates of the resin and the mixed material, respectively, to the first light beam of the wavelength $\lambda_1$, $h_{max}$ denotes a maximum effective diameter of an optical surface on a light source side of the optical element, and a denotes an angle formed by a tangential line at the maximum effective diameter $h_{max}$ of the optical surface and an optical axis.

According to such an optical pickup device, in the condition of $n_1 < n_3$, when the angle α formed by a tangential line at the maximum effective diameter $h_{max}$ of the optical surface and the optical axis satisfies the formula (7), the curvature of the optical surface on the side of the light source can be suppressed. By becoming a loose curvature, a surface of the lens has relatively shifted and tilted. In such a case, the comatic aberration deterioration is smaller than that in the optical element having a large curvature. Consequently, the degree of eccentricity tolerance on manufacture can be enlarged by satisfying the formula (7), and productivity can be improved.

According to the third aspect of the present invention, the optical pickup device of the present invention is an optical pickup device including a first light source emitting a first light beam having a wavelength $\lambda_1$ within a range of from 390 nm to 420 nm, both inclusive, and at least one optical element to perform recording and/or reproducing of information of a first optical disk having a protective substrate thickness $d_1$ mm using the first light beam from the first light source, wherein the optical element is made of a mixed material produced by dispersing particles into a resin, the particles contain particles A and particles B, a sign of a refractive index change $\Delta n_{2A}/\Delta t$ of the particles A owing to a temperature change is opposite to a sign of a refractive index change $\Delta n_1/\Delta t$ of the resin owing to a temperature change, or an absolute value of the refractive index change $\Delta n_{2A}/\Delta t$ is smaller than an absolute value of the refractive index change $\Delta n_1/\Delta t$, and a sign of a refractive index change $\Delta n_{2B}/\Delta \lambda_1$ owing to a wavelength change of the particles B is opposite to a sign of a refractive index change $\Delta n_1/\Delta \lambda_1$ owing to a wavelength change of the resin, or an absolute value of the refractive index change $\Delta n_{2B}/\Delta \lambda_1$ is smaller than an absolute value of the refractive index change $\Delta n_1/\Delta \lambda_1$.

According to such an optical pickup device, an optical element is made of a mixed material using a resin as a mother material. The mixed material is made of dispersing fine particles A and fine particles B into the resin. The fine particles A have a refractive index change ($\Delta n_{2A}/\Delta t$) owing to a temperature change. The sign of the refractive index change ($\Delta n_{2A}/\Delta t$) is opposite to that of the refractive index change ($\Delta n_1/\Delta t$) of the resin owing to a temperature change, or the absolute value of the refractive index change ($\Delta n_{2A}/\Delta t$) is smaller than that of the refractive index change ($\Delta n_1/\Delta t$). The fine particles B have a refractive index change ($\Delta n_{2B}/\Delta \lambda_1$) owing to a wavelength change. The sign of the refractive index change ($\Delta n_{2B}/\Delta \lambda_1$) is opposite to that of the refractive index change ($\Delta n_1/\Delta \lambda_1$) of the resin owing to a wavelength change, or the absolute value of the refractive index change ($\Delta n_{2B}/\Delta \lambda_1$) is smaller than that of the refractive index change ($\Delta n_1/\Delta \lambda_1$). Thereby, it becomes possible to suppress both of the change quantity of the refractive index to a temperature change and the change quantity of the refractive index to a wavelength change.

In this case, it is preferable that the particles A and the particles B are mutually different particles.

According to such an optical pickup device, when a ratio of the total volume of the fine particles A and the fine particles B to be dispersed into the resin as the mother material and the volume of the mother material exceeds 40:60, the formability of the mixed material become bad. If the fine particles A and the fine particles B are mutually different particles, the ratio of the volumes of the two kinds of the particles of A and B can be freely changed in order to obtain a target mixed material. To put it concretely, in case of attaching importance to the refractive index change owing to the temperature change of the obtained mixed material, the fine particles A can be dispersed in a quantity larger than that of the other particles B. In case of attaching importance to the refractive wavelength change owing to the wavelength change of the obtained mixed material, the fine particles B can be dispersed in a quantity larger than that of the other particles A. Incidentally, the fine particles A and the fine particles B are not necessarily one kind of fine particles, severally.

Moreover, it is preferable that the particles A and the particles B are the same particles.

According to such an optical pickup device, when a ratio of the total volume of the fine particles A and the fine particles B to be dispersed into the resin as the mother material and the volume of the mother material exceeds 40:60, the formability of the mixed material become bad. Because the fine particles A and the fine particles B are the same particles, it is possible to made the mixed material to be the athermal resin which does not influence the formability while producing the suppression effect of the refractive index change sufficiently.

Moreover, it is preferable that a spherical aberration $SA_1$ [λ rms] produced when an operating temperature of the optical pickup device has risen by 30° C. satisfies a following relation, $$|(SA_1/\lambda_1^2)\cdot(\Delta n_3/\Delta t)\cdot NA^4\cdot 2d_1\cdot 10^9|\leq 9.9 \quad (1)$$

where $SA_1$ denotes a sum of squares of a third order spherical aberration, a fifth order spherical aberration and a seventh order spherical aberration, $\Delta n_3/\Delta t$ denotes the refractive index change owing to the temperature change of the mixed material, and NA denotes a numerical aperture on an exit side of an optical element located nearest to an optical disk side among optical elements which the optical pickup device contains.

According to such an optical pickup device, if the spherical aberration $SA_1$ [λ rms] generated when the environmental temperature has risen by 30° C. is the numerical value satisfying the formula (1), the spherical aberration $SA_1$ is equal to the Marecehal limit 0.07 [λ rms] or less, and recording and reproducing can be performed without any troubles with the corresponding NA to the optical disk having the protective substrate thickness $d_1$ [mm].

Moreover, it is preferable that a following relation of formula (2) is satisfied, $$|(\Delta n_1/\Delta t)|\geq 2\cdot|(\Delta n_3/\Delta t)| \quad (2).$$

According to such an optical pickup device, it is possible to make an optical element one in which the spherical aberration generated at the time when the environment temperature has risen by 30° C. is suppressed to be the Marechal limit 0.07 [λ rms] or less when the refractive index change ($\Delta n_3/\Delta t$) of the mixed material owing to a temperature change is 50% or less of the refractive index change ($\Delta n_1/\Delta t$) of the mother material owing to a temperature change. The mixed material is produced by dispersion the fine particles A having the refractive index change ($\Delta n_{2A}/\Delta t$) owing to a temperature and the fine particles B having the refractive index change ($\Delta n_{2B}/\Delta\lambda_1$) owing to the wavelength change into the mother material.

Moreover, it is preferable that the sign of $\Delta n_{2A}/\Delta t$ is opposite to the sign of $\Delta n_1/\Delta t$.

Moreover, it is preferable that an Abbe number $v_{d3}$ on a d line of the mixed material satisfies a following relation of formula (3), $$1.1\cdot v_{d1}\leq v_{d3} \quad (3)$$

where $v_{d1}$ denotes an Abbe number on the d line of the resin, $v_{d1}$ and $v_{d3}$ can be both obtained from $v_d=(n_d-1)/(n_F-n_c)$, $n_d$ denotes the refractive index of the resin on the d line, $n_F$ denotes a refractive index on an F line of the resin, and $n_c$ denotes a refractive index on a C line of the resin.

According to such an optical pickup device, it is possible to correct the spherical aberration at the time when there is a shift from the reference wavelength by the quantity of dispersion to be smaller than that of the earlier resin to be equal to or less than the Marechal limit 0.07 [λ rms] when the Abbe number $v_{d3}$ on the d line of the mixed material is 1.1 times or more of the Abbe number $v_{d1}$ on the d line of the mother material.

Moreover, it is preferable that a spherical aberration $SA_2$ [λ rms] produced when the wavelength of the first light beam from the first light source is changed by ±5 nm from $\lambda_1$ satisfies a following relation of formula (4), $$|(SA_2/\lambda_1^2)\cdot(\Delta n_3/\Delta\lambda_1)\cdot NA^4\cdot 2d_1\cdot 10^9|\leq 18.5 \quad (4)$$

where $SA_2$ denotes a sum of squares of a third order spherical aberration, a fifth order spherical aberration and a seventh order spherical aberration, $\Delta n_3/\Delta\lambda_1$ denotes the refractive index change by the wavelength change of the mixed material, and NA denotes a numerical aperture on an exit side of an optical element located nearest to an optical disk side among optical elements which the optical pickup device contains.

According to such an optical pickup device, the spherical aberration $SA_2$ generated at the time when the wavelength $\lambda_1$ (390 nm to 420 nm) has changed to be a wavelength $\lambda_1'$ different from the wavelength $\lambda_1$ by ±5 nm becomes large in proportion to the 4th power of the NA. Consequently, if the spherical aberration $SA_2$ satisfies the formula (4), recording and reproducing can be performed satisfactory in the optical disk of the corresponding NA.

Moreover, it is preferable that a positionally changed minimum quantity of wavefront aberration $\Delta fb$ [µm] in an optical axis direction of a converged spot formed on an information recording surface of the first optical disk when the wavelength of the first light beam from the first light source has changed from $\lambda_1$ by ±1 nm satisfies a following relation of formula (5), $$|\Delta fb/\Delta\lambda_1|\leq 0.4 \quad (5).$$

According to such an optical pickup device, if the positionally changed minimum quantity of wavefront aberration $\Delta fb$ (µm) of the optical axis direction in the converged spot formed on the information recording surface of the optical disk is the value satisfying the formula (5) when the wavelength $\lambda_1$ has changed by ±1 nm in the optical element made of a mixed material, even if the wavelength change by a mode hop arises, in the optical disk using the λ, recording and reproducing can be performed satisfactory.

In accordance with the fourth aspect of the present invention, the optical pickup device of the present invention is an optical element to be used for an optical pickup device for performing recording and/or reproducing of information of a first optical disk having a protective substrate thickness d1 mm using a first light beam having a wavelength $\lambda_1$ within a range of from 390 nm to 420 nm, both inclusive, the first light beam emitted from a first light source, wherein the optical element is made of a mixed material produced by dispersing particles into a resin, a sign of a refractive index change $\Delta n_2/\Delta t$ of the particles owing to a temperature change is opposite to a sign of a refractive index change $\Delta n_1/\Delta t$ of the resin owing to a temperature change, or an absolute value of the refractive index change $\Delta n_2/\Delta t$ is smaller than an absolute value of the refractive index change $\Delta n_1/\Delta t$, and a spherical aberration $SA_1$ [λ rms] produced when an operating temperature of the optical pickup device rises by 30° C. satisfies a following relation of formula (1), $$|(SA_1/\lambda_1^2)\cdot(\Delta n_3/\Delta t)\cdot NA^4\cdot 2d_1\cdot 10^9|\leq 9.9 \quad (1)$$

where $SA_1$ denotes a sum of squares of a third order spherical aberration, a fifth order spherical aberration and a seventh order spherical aberration, $\Delta n_3/\Delta t$ denotes the refractive index change owing to the temperature change of the mixed material, and NA denotes a numerical aperture on an exit side of an optical element located nearest to an optical disk side among optical elements which the optical pickup device contains.

In accordance with the fifth aspect of the present invention, the optical element of the present invention is an optical element to be used for an optical pickup device performing recording and/or reproducing of information of a first optical disk having a protective substrate thickness d1 mm using a first light beam having a wavelength $\lambda_1$ within a range of from 390 nm to 420 nm, both inclusive, the first light beam emitted from a first light source, wherein the optical element is made of a mixed material produced by dispersing particles into a resin, and a sign of a refractive index change $\Delta n_2/\Delta\lambda_1$ of the particles owing to a wavelength change is opposite to a refractive index change $\Delta n_1/\Delta\lambda_1$ of the resin owing to a wavelength change, or an absolute value of the refractive index change $\Delta n_2/\Delta\lambda_1$ is smaller than an absolute value of the refractive index change $\Delta n_1/\Delta\lambda_1$.

In accordance with the sixth aspect of the present invention, the optical element of the present invention is an optical element to be used for an optical pickup device performing recording and/or reproducing of information of a first optical disk having a protective substrate thickness d1 mm using a first light beam having a wavelength $\lambda_1$ within a range of from 390 nm to 420 nm, both inclusive, the first light beam emitted from a first light source, wherein the optical element is made of a mixed material produced by dispersing particles into a resin, the particles contain particles A and particles B, a sign of a refractive index change $\Delta n_{2A}/\Delta t$ of the particles A owing to a temperature change is opposite to a sign of a refractive index change $\Delta n_1/\Delta t$ of the resin owing to a temperature change, or an absolute value of the refractive index change $\Delta n_{2A}/\Delta t$ is smaller than an absolute value of the refractive index change $\Delta n_1/\Delta t$, and a sign of a refractive index change $\Delta n_{2B}/\Delta\lambda_1$ of the particles B owing to a wavelength change is opposite to a sign of a refractive index change $\Delta n_1/\Delta\lambda_1$ owing to a wavelength change of the resin, or an absolute value of the refractive index change $\Delta n_{2B}/\Delta\lambda_1$ is smaller than an absolute value of the refractive index change $\Delta n_1/\Delta\lambda_1$.

In accordance with the seventh aspect of the present invention, the optical pickup device of the present invention is an optical pickup device including a first light source emitting a first light beam having a wavelength $\lambda_1$ within a range of from 390 nm to 420 nm, both inclusive, a second light source emitting a second light beam having a wavelength $\lambda_2$ within a range of from $1.5\times\lambda_1$ to $1.7\times\lambda_1$ both inclusive, and at least one optical element, the optical pickup device performing recording and/or reproducing of information of a first optical disk having a protective substrate thickness $d_1$ mm using the first light beam from the first light source, and performing recording and/or reproducing of information of a second optical disk having a protective substrate thickness $d_2$ mm ($0.8\times d_1 \leq d_2$) using the second light beam from the second light source, wherein the first light beam and the second light beam pass the optical element, the optical element is made of a mixed material produced by dispersing particles into a resin, a sign of a refractive index change $\Delta n_2/\Delta t$ of the particles owing to a temperature change is opposite to a sign of the refractive index change $\Delta n_1/\Delta t$ of the resin owing to a temperature change, or an absolute value of the refractive index change $\Delta n_2/\Delta t$ is smaller than an absolute value of a refractive index change $\Delta n_1/\Delta t$, and a refractive index change $\Delta n_3/\Delta t$ of the mixed material owing to a temperature change satisfies a following relation of formula (8), $$|\Delta n_3/\Delta t| \leq 8.0\times 10^{-5} [°\text{C.}^{-1}] \quad (8).$$

According to such an optical pickup device, it becomes possible to reduce the refractive index accompanying a temperature change, with the formability of the plastic material being held. Then, though the objective is the single lens of a high NA, the spherical aberration change owing to the refractive index change can be suppressed small.

There is also an advantage of enabling the single lens of NA 0.85 with which a converging performance does not deteriorate even if the environmental temperature changes by using such an athermal resin as the material of an optical element to be mass-produced by injection molding.

In this case the particles contain particles A and particles B, a sign of a refractive index change $\Delta n_{2A}/\Delta t$ of the particles A owing to a temperature change is opposite to a sign of a refractive index change $\Delta n_1/\Delta t$ of the resin owing to a temperature change, or an absolute value of the refractive index change $\Delta n_{2A}/\Delta t$ is smaller than an absolute value of the refractive index change $\Delta n_1/\Delta t$, a sign of a refractive index change $\Delta n_{2B}/\Delta\lambda_1$ of the particles B owing to a wavelength change is opposite to a sign of a refractive index change $\Delta n_1/\Delta\lambda_1$ of the resin owing to a wavelength change, or an absolute value of the refractive index change $\Delta n_{2B}/\Delta\lambda_1$ is smaller than an absolute value of the refractive index change $\Delta n_1/\Delta\lambda_1$, and a refractive index change $\Delta n_3/\Delta\lambda_1$ of the mixed material when the wavelength of the first light beam from the first light source has changed by 10 nm from $\lambda_1$ satisfies a following relation of formula (9), $$|\Delta n_3/\Delta\lambda_1| \leq 1.3\times 10^{-4} [\text{nm}^{-1}] \quad (9).$$

According to such an optical pickup device, an optical element having a small wavefront aberration change owing to a wavelength change can be obtained.

Moreover, it is preferable that the optical element is an objective lens.

Moreover, it is preferable that a positionally changed minimum quantity of wavefront aberration $\Delta fb$ [µm] in an optical axis direction of a converged spot formed on an information recording surface of the first optical disk when the wavelength of the first light beam has changed from $\lambda_1$ satisfies a following relation of formula (10), $$|\Delta fb/\Delta\lambda_1| \leq 0.1 \quad (10),$$

where fb denotes a distance from the objective to the first optical disk.

In this case, it is preferable to include a phase structure provided in an area on at least one the optical surface of the optical element, the area being passed by the second light beam.

In this case, it is preferable that the phase structure is a diffractive structure.

Further, it is preferable that the phase structure gives a positive diffraction power to at least one of the first light beam and the second light beam.

Still further, it is preferable that the phase structure is a diffractive structure, which has a plurality of ring-shaped zones concentrically provided around the optical axis of the optical element, and a cross sectional shape, which includes the optical axis, of the phase structure is a saw-tooth shape, and wherein a height of a step of each the ring-shaped zone in the optical axis direction satisfies the following formulas (11) or (12), $$6 \times \lambda_1/(n_3-1) \leq D < 7 \times \lambda_1/(n_3-1) \quad (11)$$

$$10 \times \lambda_1/(n_3-1) \leq D < 11 \times \lambda_1/(n_3-1) \quad (12)$$

where n3 denotes a refractive index of the mixed material on the first light beam.

Moreover, it is preferable that the first light beam transmits the phase structure without being given any phase differences substantially before being used for reproducing and/or recording information to the first optical disk.

According to such an optical pickup device, by providing a phase structure in the area which the light beam having a wavelength $\lambda_2$ passes is and is on at least one optical surface of the optical elements, the following can be performed using the phase structure. That is, for example, the spherical aberration at the time of changing the wavelength of the laser diode accompanying a temperature change is suppressed, the spherical aberration in the case where the laser diode having an oscillated wavelength shifted from the reference wavelength owing to the manufacturing error is used is suppressed, or good recording/reproducing characteristics can be maintained even if the wavelength of an incident light beam instantaneously changes by the mode hopping of a laser. Furthermore, using the phase structure, the chromatic aberration caused by the wavelength difference between the first wavelength $\lambda_1$ and the second wavelength $\lambda_2$, and/or the spherical aberration caused by the difference of the thicknesses of the protective layer of the first optical disk and the protective layer of the second optical disk can be corrected. The chromatic aberration here indicates the minimum positional variation of wave front aberration in the optical axis direction resulting from the wavelength difference.

Moreover, it is preferable that an optical system magnification $m_1$ of the optical element to the first light beam and a magnification $m_2$ of the optical system of the optical element to the second light beam satisfy following relations of formulas (13) and (14), $$-1/20 \leq m_1 \leq 1/20 \quad (13)$$

$$-1/20 \leq m_2 \leq 1/20 \quad (14)$$

Moreover, it is preferable that the optical element is a collimate lens.

In this case, it is preferable that a positionally changed minimum quantity of wavefront aberration $\Delta fb$ [μm] in an optical axis direction of a converged spot formed on an information recording surface of the first optical disk when the wavelength of the first light beam has changed from $\lambda_1$ satisfies a following relation, $$|\Delta fb/\Delta \lambda_1| \leq 0.1 \quad (10)$$

where fb denotes a distance from the objective to the first optical disk.

Moreover, it is preferable that the first light source and the second light source are integrated in a housing by being arranged close to each other.

Moreover, it is preferable that the optical pickup device further includes a third light source emitting a third light beam having a wavelength $\lambda_3$ within a range of from 750 nm to 820 nm both inclusive, wherein the optical pickup device performs recording and/or reproducing information of the third optical disk having a protective substrate thickness $d_3$ mm using the third light beam from the third light source, and the first light beam, the second light beam and the third light beam pass the optical element.

Moreover, it is preferable that the second light source and the third light source are integrated by being arranged close to each other in a housing.

Moreover, it is preferable that the first light source, the second light source and the third light source are integrated by being arranged close to each other in a housing.

It is preferable that the protective substrate thickness d2 and d1 satisfy the following formula (15).

$$d_2 \leq 1.2 d_1 \quad (15)$$

Moreover, it is preferable that an average particle diameter of the particles is 50 nm or less.

Moreover, it is preferable that the average particle diameter of the particles is 40 nm or less.

Moreover, it is preferable that the particles contain particles A and particles C, a sign of a refractive index change $\Delta n_{2A}/\Delta t$ of the particles A owing to a temperature change is opposite to a sign of a refractive index change $\Delta n_1/\Delta t$ of the resin owing to a temperature change, or an absolute value of the refractive index change $\Delta n_{2A}/\Delta t$ is smaller than an absolute value of the refractive index change $\Delta n_1/\Delta t$, dispersion of the particles C is smaller than dispersion of the resin, and an average particle diameter of the particles C is 40 nm or less.

Moreover, it is preferable that the particles contain particles A and particles C, a sign of a refractive index change $\Delta n_{2A}/\Delta t$ of the particles A owing to a temperature change is opposite to a sign of a refractive index change $\Delta n_1/\Delta t$ of the resin owing to a temperature change, or an absolute value of the refractive index change $\Delta n_{2A}/\Delta t$ is smaller than an absolute value of the refractive index change $\Delta n_1/\Delta t$, dispersion of the particles C is smaller than dispersion of the resin, and the particles A and the particles C are the same particles.

Moreover, it is preferable that a weight ratio of the particles to the resin is 50 weight percents or less.

Moreover, it is preferable that the particles contain particles A and particles C, a sign of a refractive index change $\Delta n_{2A}/\Delta t$ of the particles A owing to a temperature change is opposite to a sign of a refractive index change $\Delta n_1/\Delta t$ of the resin owing to a temperature change, or an absolute value of the refractive index change $\Delta n_{2A}/\Delta t$ is smaller than an absolute value of the refractive index change $\Delta n_1/\Delta t$, dispersion of the particles C is smaller than dispersion of the resin, and a weight ratio of the particles C to the resin is 50 weight percents or less.

In accordance with the eighth aspect of the present invention, an optical element of the present invention is an optical element to be used for an optical pickup device performing recording and/or reproducing information of a first optical disk having a protective substrate thickness $d_1$ mm using a first light beam having a wavelength $\lambda_1$ within a range of from 390 nm to 420 nm both inclusive, performing recording and/or reproducing information of a second optical disk having a substrate thickness $d_2$ mm ($0.8 \times d_1 \leq d_2$) using a second light beam having a wavelength $\lambda_2$ within a range of from $1.5 \times \lambda_1$ to $1.7 \times \lambda_1$ both inclusive, the second light beam emitted from a second light source, wherein the first light beam and the second light beam pass the optical element, the optical element is made of a mixed material produced by dispersing particles into a resin, a sign of a refractive index change $\Delta n_2/\Delta t$ of the particles owing to a temperature change is opposite to a sign of a refractive index change $\Delta n_1/\Delta t$ of the resin owing to a temperature change, or an absolute value of the refractive index change $\Delta n_2/\Delta t$ is smaller than an absolute value of the refractive index change $\Delta n_1/\Delta t$, and a refractive index change $\Delta n_3/\Delta t$ of the mixed material owing to a temperature change satisfies a following relation of formula (8), $$|\Delta n_3/\Delta t| \leq 8.0 \times 10^{-5} [° C.^{-1}] \quad (8)$$

BRIEF DESCRIPTION OF THE DRAWINGS

The present invention will become more fully understood from the detailed description given hereinbelow and the accompanying drawings which are given by way of illustration only, and thus are not intended as a definition of the limits of the present invention, and wherein:

FIG. 6 is a plan view of the principal part showing the configuration of an optical pickup device.

PREFERRED EMBODIMENTS OF THE INVENTION

First Embodiment

In the following, referring to the attached drawings, a first embodiment for implementing the present invention is described in detail.

Figure 1:
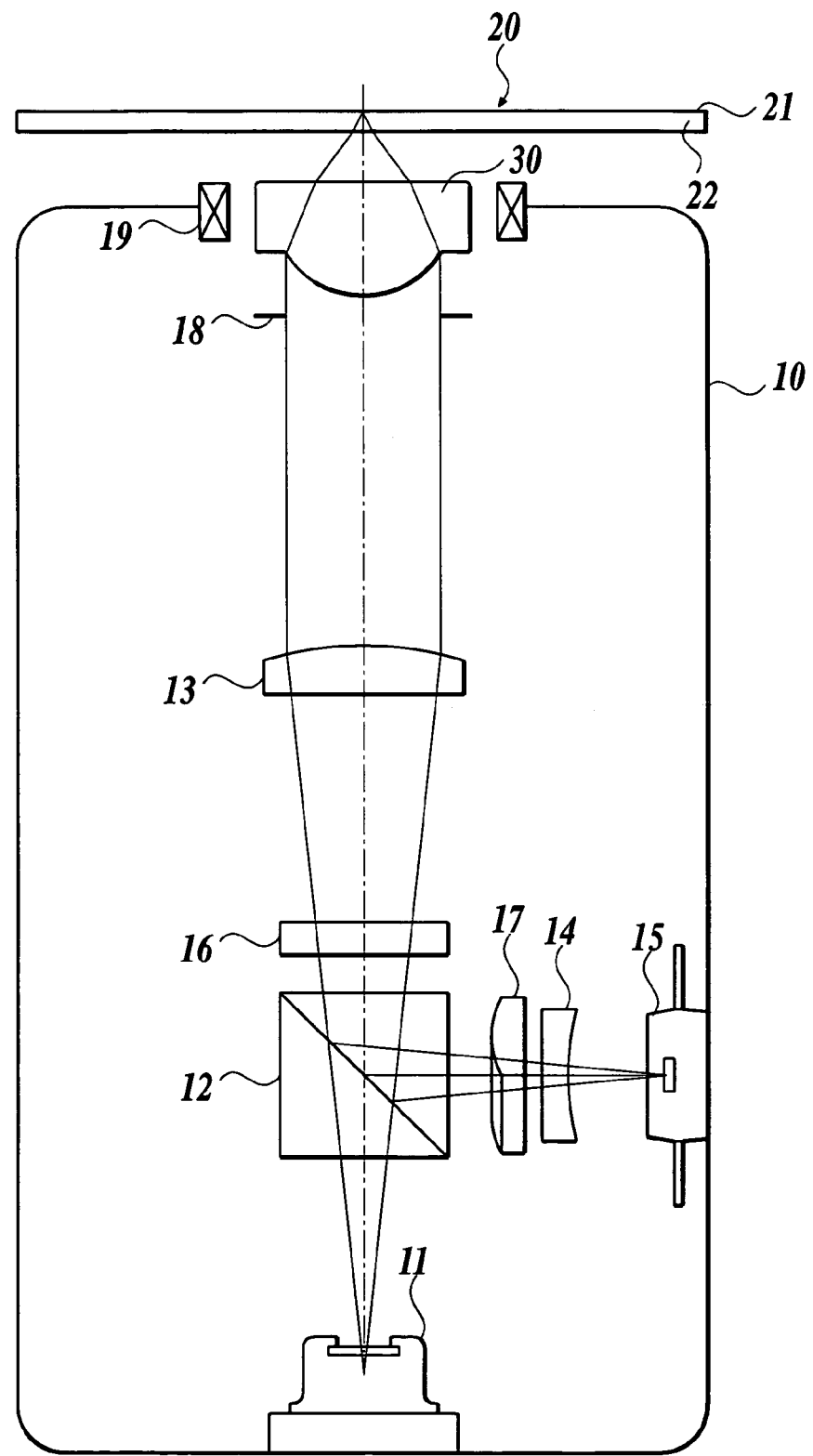
FIG. 1 is a plan view of the principal part showing the configuration of an optical pickup device.

FIG. 1 is a view schematically showing the configuration of an optical pickup device 10 capable of performing informational recording/reproducing adequately to a BD 20 (a first optical disk). The optical specifications of BD are: the wavelength $\lambda_1$ thereof is 405 nm, the thickness $d_1$ of the protective layer (protective substrate) 22 thereof is 0.1 mm, and the numerical aperture NA thereof is 0.85.

However, the combination of the wavelength, the thickness of the protective layer and the numerical aperture is not restricted to the one. Moreover, as the optical disk, a HD having a numerical aperture NA being about 0.65 and a protective layer 22 having a thickness $d_1$ being about 0.6 mm may be used as the optical disk.

The optical pickup device 10 comprises a blue-violet laser diode 11 as a first light source, a polarized beam splitter 12, a quarter wavelength plate 16, a collimate lens 13, an iris 18, an objective 30 (the optical element of the present invention), a focusing/tracking two-shaft actuator 19, a cylindrical lens 17, a concave lens 14 and a photo detector 15.

A diverging light beam (a first light beam) emitted from the blue-violet laser diode 11 passes the polarized beam splitter 12, and turns into a circularly polarized parallel light beam through the quarter wavelength plate 16 and the collimate lens 13. After that, the diameter of the light beam is regulated by the iris 18, and the light beam becomes a spot formed on an information recording surface 21 by the objective 30 through the protective layer 22 of the high density optical disk 20.

A reflected light beam modulated by an information pit on the information recording surface 21 turns into a converged light beam again through the objective 30, the iris 18 and the collimate lens 13. After that, the converged light beam transmits the quarter wavelength plate 16, and thereby becomes linearly polarized light. The linearly polarized light is reflected by the polarized beam splitter 12, and passes the cylindrical lens 17 and the concave lens 14 to be given astigmatism. Then the light is converged on the photo detector 15. Thus the information recorded on the information recording surface 21 of the high density optical disk 20 can be read using an output signal of the photo detector 15.

Incidentally, as the light source of emitting a laser beam having a wavelength of about 400 nm, an SHG blue-violet laser using the second harmonic generation method may be used instead of the blue-violet laser diode.

Next, the configuration of the objective 30 is described.

The objective is a single lens made of an athermal resin. The objective is configured to be one group composed of one sheet. Both of the optical surfaces of the objective on both of the light source side and the optical disk side are severally configured to be an aspherical surface.

The athermal resin is a mixed material made by dispersing fine particles to a resin as a mother resin. The fine particles have a refractive index change ($\Delta n_2/\Delta t$) caused by a temperature change. The refractive index change has an opposite sign of the refractive index change ($\Delta n_1/\Delta t$) caused by a temperature change of the resin as the mother resin, and temperature change of a reverse mark to the resin as a mother material. The athermal resin is set in order that a spherical aberration $SA_1$ [$\lambda$ rms] produced when the operating temperature of the optical pickup device 10 rises by 30° C. may satisfy formula (1).

$$|(SA_1/\lambda_1^2) \cdot (\Delta n_3/\Delta t) \cdot NA^4 \cdot 2d_1 \cdot 10^9| \leq 9.9 \quad (1)$$

wherein $SA_1$ denotes sum of squares of the third order, the fifth order and the seventh order, $\Delta n_3/\Delta t$ denotes a refractive index change by a temperature change of the mixed material, and NA denotes the numerical aperture of the objective which the pickup apparatus has.

Figure 2A:
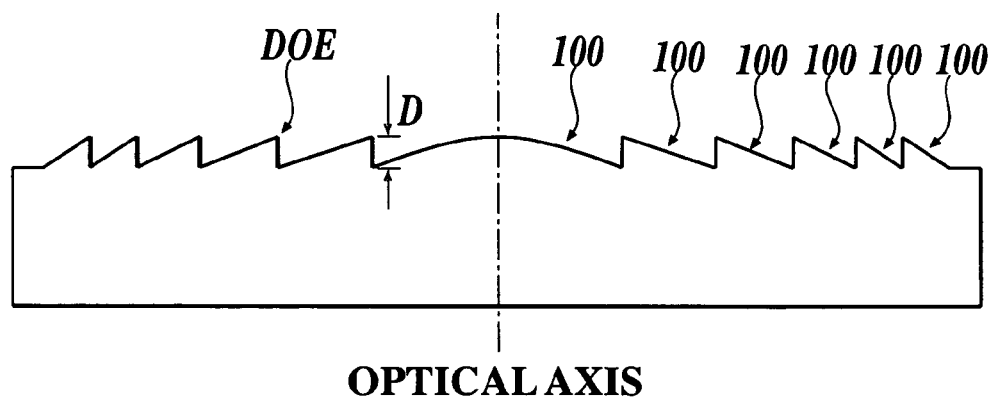
FIGS. 2A and 2B are views showing phase structures.
Figure 2B:
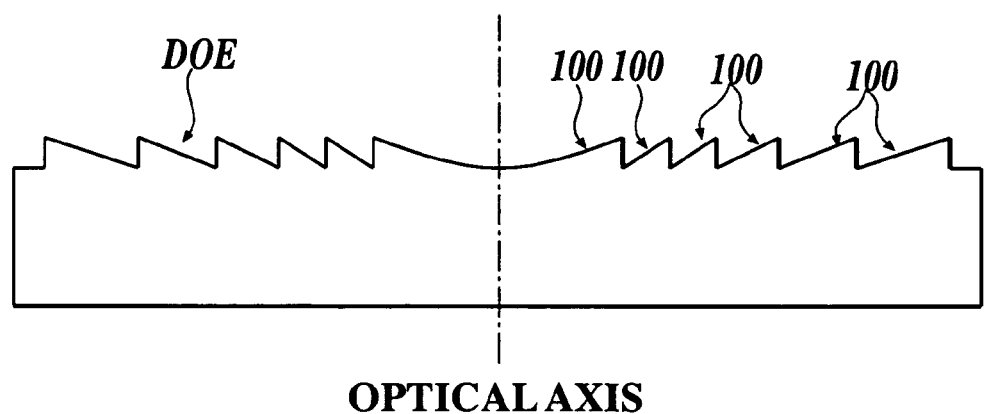
Figure 3A:
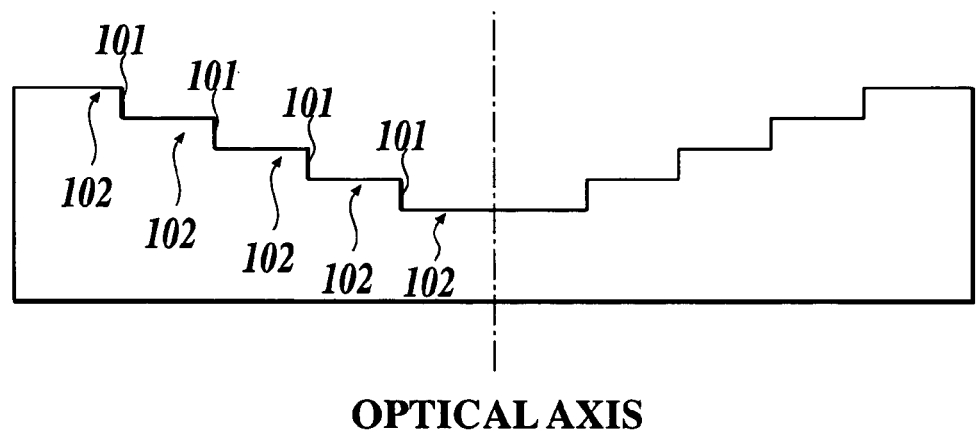
FIGS. 3A and 3B are views showing phase structures.
Figure 3B:
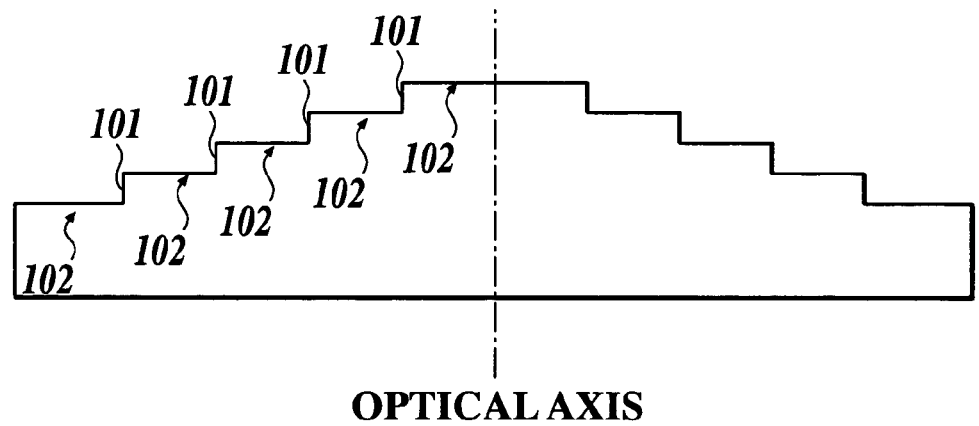
Figure 4A:
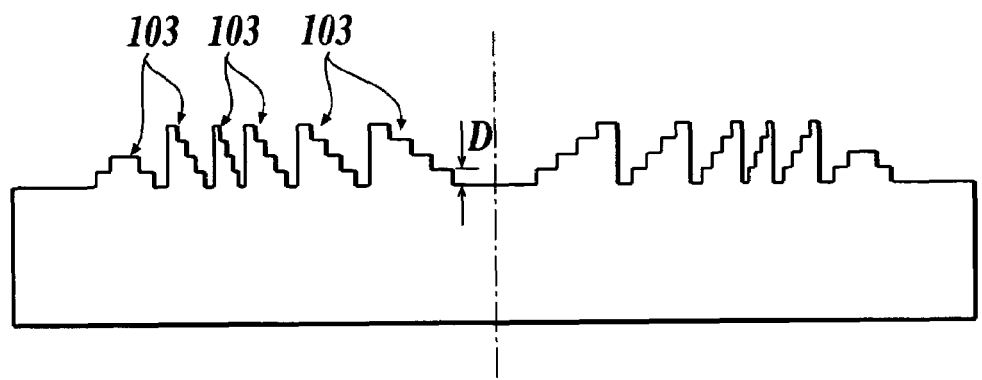
FIGS. 4A and 4B are views showing phase structures.
Figure 4B:
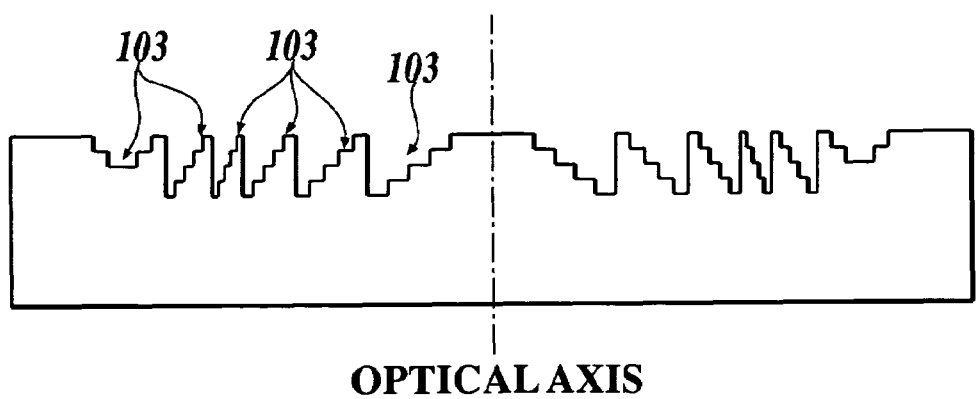
Figure 5A:
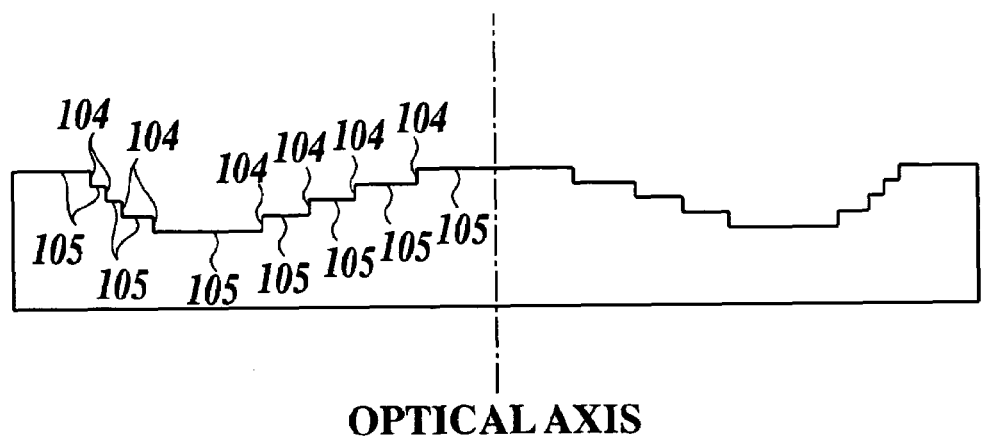
FIGS. 5A and 5B are views showing phase structures.
Figure 5B:
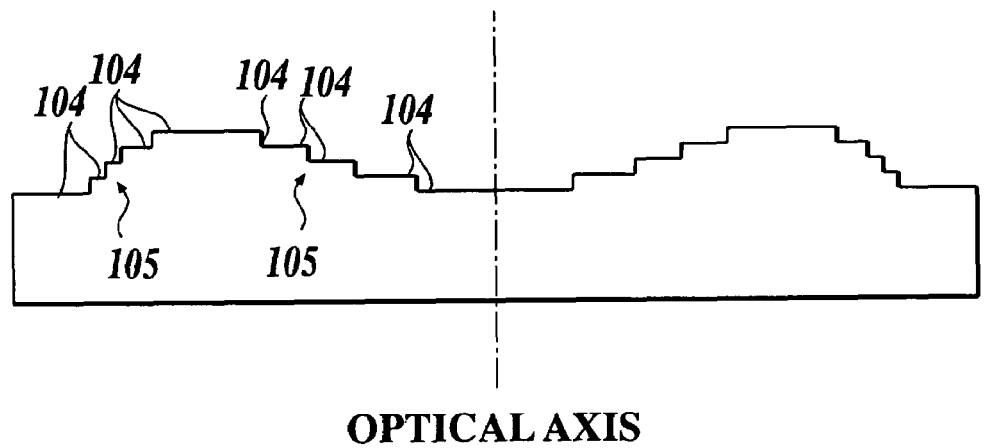

A phase structure is provided on the optical surface of an objective. As the phase structure, any of the diffractive structure and the optical path difference giving structure may be adopted. There are the following diffractive structures. As schematically shown in FIGS. 2A and 2B, a diffractive structure comprises a plurality of ring surfaces 100 having a sectional form including an optical axis which is a sawtooth form. As schematically shown in FIGS. 3A and 3B, a diffractive structure comprises a plurality of ring surfaces 102 having a step 101 between each of them. The directions of the steps 101 are the same in the effective diameter. The sectional form including the optical axis is a step form. As schematically shown in FIGS. 4A and 4B, a diffractive structure comprises a plurality of ring surfaces 103, each having a step structure therein. As schematically shown in FIGS. 5A and 5B, a diffractive structure comprises a plurality of ring surfaces 105 in which the directions of the steps 104 interchange in the middle of the effective diameter. The sectional form including the optical axis is a step form. Moreover, as schematically shown in FIGS. 5A and 5B, as the optical path difference giving structure, there is a structure which comprises a plurality of ring surfaces 105 including the steps 104 the directions of which interchange in the middle of the effective diameter, and the sectional form, including the optical axis, of which is a step form. Consequently, the structure schematically shown in FIGS. 5A and 5B may be a diffractive structure, or may be an optical path difference giving structure. Incidentally, although FIGS. 2A to 5B schematically show the cases where each phase structure is formed on a plane, each phase structure may be formed on a spherical surface or an aspherical surface. Incidentally, in the present specification, the diffractive structures comprising the plurality of ring surfaces as shown in FIGS. 2A, 2B, 3A, 3B, 5A and 5B are denoted by a mark "DOE", and the diffractive structure comprising the plurality of ring surfaces each having a step structure formed in the inside as shown in FIGS. 4A and 4B is denoted by a mark "HOE".

By providing such phase structures, for example, the spherical aberration in the case where the wavelength of a laser diode has changed owing to a temperature change can be suppressed, the spherical aberration in the case of using a laser diode having an oscillated wavelength shifted from a reference wavelength owing to a manufacturing error can be suppressed, or a recording/reproducing characteristic can be maintained even when the wavelength of an incident light beam has changes instantaneously owing to a mode hopping of a laser.

Moreover, although in the present embodiment the optical pickup device 10 is set to be equipped with one laser light source 11 and performs the reproducing/recording of information to one kind of standard (or recording density) optical disk (BD in the present embodiment), the present invention is not limited to the form of the embodiment, but the present invention may be configured to be an optical pickup device using two light sources or more and having a compatibility between two or more kinds of standard optical disks (for example, a high density optical disk and a DVD, and a high density optical disk, a DVD and a CD). For example, in case of an optical pickup device which has compatibility between a high density optical disk and a DVD, chromatic aberration caused by the difference between the wavelengths of a first wavelength $\lambda_1$ for the high density optical disk and a second wavelength $\lambda_2$ for the DVD, and/or spherical aberration caused by the difference between the thicknesses of the protective layer of the high density optical disk and the protective layer of the DVD can be corrected using the phase structure formed in the objective. Incidentally, the chromatic aberration here indicates the minimum positional variation of wave front aberration in the optical axis direction resulting from a wavelength difference. For example, by setting the phase structure to be a diffractive structure giving a positive diffraction operation to at least one light beam of the light beams having the wavelengths $\lambda_1$ and $\lambda_2$, chromatic aberration caused by wavelength changes of the light beam to which the diffraction operation is given can be suppressed.

As mentioned above, according to the objective (optical element) and the optical pickup device which have been shown in the present embodiment, the objective is configured with a single sheet lens made of a mixed material (athermal resin) produced by dispersing fine particles having the refractive index change ($\Delta n_2/\Delta t$) by a temperature change having the opposite sign to the refractive index change ($\Delta n_1/\Delta t$) by a temperature change of the resin as the mother material to the resin, and the spherical aberration $SA_l$ [$\lambda$ rms] produced when the operating temperature of the optical pickup device 10 rises by 30° C. may satisfy the formula (1)

In such a way, by mixing the fine particles which have the $\Delta n_2/\Delta t$ of an opposite sign to that of the resin (plastic resin) generally used hitherto to the resin to make the athermal resin having a decreased refractive index change ($\Delta n_3/\Delta t$) by a temperature change a material of the objective, the change quantity of the refractive index to the temperature changes can be suppressed, and it is possible to make the high NA single lens to be an optical element the converging performance of which does not deteriorate even if the environmental temperature thereof changes.

Incidentally, although in the embodiment described above the objective set to be made of the mixed material having a resin as the mother material and being produced by dispersing the fine particles having the opposite sign refractive index change ($\Delta n_2/\Delta t$) by a temperature change to the refractive index change ($\Delta n_1/\Delta t$) by a temperature change of the resin to the resin, the objective is not limited to only this type. The objective may be made of a mixed material using a resin as the mother material thereof and dispersing fine particles having an opposite sign refractive index change ($\Delta n_2/\Delta \lambda_1$) by a variation of wavelength to a refractive index change ($\Delta n_1/\Delta \lambda_1$) by a variation of wavelength of the resin to the resign. Alternatively, the objective may be made of a mixed material having a resin as the mother material and being produced by dispersing fine particles A having an opposite sign refractive index change ($\Delta n_{2A}/\Delta t$) by a temperature change to a refractive index change ($\Delta n_1/\Delta t$) by a temperature change of the resin, and fine particles B having an opposite sign refractive index change ($\Delta n_{2B}/\Delta \lambda_1$) by a variation of wavelength to a refractive index change ($\Delta n_1/\Delta \lambda_1$) by a variation of wavelength of the resign into the resign.

Thereby, it becomes possible to suppress the changed quantity of the refractive index to a variation of wavelength. Though the objective is a high NA single lens, the degree of freedom of lens design becomes large in comparison with earlier one. As a result, for example, the advantages such that it is possible to enlarge the eccentricity tolerance of manufacturing a lens, and that it is possible to reduce the chromatic aberration of an objective can be obtained.

Moreover, by using both of the function of the athermal resin and the function of the phase structure provided on the optical surface of the objective, for example, it is possible to suppress the spherical aberration at the time of changing the wavelength of the laser diode accompanying temperature change, it is possible to suppress the spherical aberration in the case where the laser diode the oscillated wavelength of which has been shifted from the reference wavelength owing to a manufacturing error is used, or it is possible to improve recording/reproducing characteristics when the wavelength of an incident light beam instantaneously changes by a mode hopping of laser.

EXAMPLE

Next, examples of the optical element shown in eh embodiment are described.

The lens data of an example 1 is shown in Table 1.

TABLE 1

| Example 1 lens data | |
|---|---|
| focal length of objective lens | f1 = 1.78 mm |
| image-surface side numerical aperture | NA1: 0.85 |
| two-surface diffraction order | 3 |
| magnification | 0 |

TABLE 1-continued

| i-th surface | ri | di (405 nm) | ni (405 nm) |
|---|---|---|---|
| 0 | | ∞ | |
| 1 | ∞ | 0.0 | |
| (stop size) | | (φ 3.026 mm) | |
| 2 | 1.56170 | 2.3 | 1.56013 |
| 3 | −1.79283 | 0.35 | 1.0 |
| 4 | ∞ | 0.1 | 1.61950 |
| 5 | ∞ | | | aspherical surface data

2nd surface
aspherical surface coefficient

κ −5.3382E−1
A4 +2.1727E−2
A6 −3.6025E−3
A8 +9.1609E−3
A10 −7.7932E−3
A12 +4.0970E−3
A14 −5.0659E−4
A16 −4.1833E−4
A18 +1.4263E−4
A20 −9.8308E−6
optical path difference function B2 −2.8032E−5
B4 −1.7600E−2
B6 −4.2649E+1
B8 +3.2010E−10
B10 −4.2679E+01
3rd surface
aspherical surface coefficient κ −8.4355E+1
A4 +3.7849E−1
A6 −9.5130E−1
A8 −8.1411E−1
A10 +4.0391E−1
A12 −1.1316E+0
A14 +5.4573E−1

*di denotes displacement from $i^{th}$ surface to $(i+1)^{th}$ surface

As shown in Table 1, in the present example, the optical element of the present invention is applied to the objective. The objective is used as only for BD, and is set to have a focal distance f1=1.78 mm at the time of the wavelength λ=405 nm, and magnification =0.

The incidence plane (the second surface) and the exit plane (the third surface) of an objective are formed to be an aspherical surface being axial symmetry around the optical axis regulated by a formula formed by substituting the coefficients shown in Table 1 to the following formula 2.

$$x = \frac{h^2/r}{1+\sqrt{1-(1+\kappa)(h/r)^2}} + \sum_{i=2} A_{2i} h^{2i} \quad \text{[Formula 2]}$$

where a letter x denotes an axis in the optical axis direction (the advancing direction of light is made to be positive), a letter κ denotes a cone coefficient, and a letter $A_{2i}$ denotes an aspherical surface coefficient.

Moreover, the diffractive structure DOE is formed in the third surface. The diffractive structure DOE is expressed by an optical path difference added to a transmitted wave front by this structure. The optical path difference is expressed by an optical path difference function φ(h) (mm) defined by substituting the coefficients shown in Table 1 into the following formula 3, $$\text{optical path difference function } \Phi(h) = \left(\sum_{i=0}^{5} B_{2i} h^{2i}\right) \times n \times \frac{\lambda}{\lambda B} \quad \text{[Formula 3]}$$

Where h(mm) denotes an height in a direction perpendicular to the optical axis, $B_{2i}$ denotes an optical path difference function coefficient, n denotes a diffraction order of diffracted light having the maximum diffraction efficiency of the diffracted light of an incident light beam, $\lambda_1$ (nm) denotes the wavelength of the light beam entering the diffractive structure, and $\lambda_1 B$ (nm) denotes a manufacturing wavelength of the diffractive structure.

Incidentally, the blazed wavelength $\lambda_1$ of the diffractive structure DOE is 1.0 mm.

Moreover, in the objective of the present example, each constant is set as follows: $SA_1$=0.059 λ rms, $\Delta n_3/\Delta t$=−5.31×$10^{-5}$, NA=0.850, and $d_1$=0.100 (mm). Consequently, it is found that the formula (1) is satisfied because $|(SA_1/\lambda_1^2) \cdot (\Delta n_3/\Delta t) \cdot NA^4 \cdot 2d \cdot 10^9|$=8.08.

Moreover, the following constants are set as follows: $\Delta n_1/\Delta t$=−9.81×$10^{-5}$, $\Delta n_3/\Delta t$=−5.31×$10^{-5}$, and $(\Delta n_1/\Delta t)/(\Delta n_3/\Delta t)$=1.85. Consequently, it turns out that the above-mentioned formula (2) is satisfied.

The lens data of an example 2 is shown in Table 2.

TABLE 2

Example 2 lens data

| focal length of objective lens | $f_1$ = 1.77 mm |
| image-surface side numerical aperture | NA1: 0.85 |
| two-surface diffraction order | 3 |
| magnification | 0 |

| i-th surface | ri | di (405 nm) | ni (405 nm) |
|---|---|---|---|
| 0 | | ∞ | |
| 1 | ∞ | 0.0 | |
| (stop size) | | (φ 3.026 mm) | |
| 2 | 1.25808 | 2.3 | 1.56192 |
| 3 | −1.98654 | 0.48 | 1.0 |
| 4 | ∞ | 0.1 | 1.61950 |
| 5 | ∞ | | | aspherical surface data

2nd surface
aspherical surface coefficient

κ −6.9604E−1
A4 +1.8590E−2
A6 +6.5583E−3
A8 −3.9316E−3
A10 +4.4503E−3
A12 −6.1401E−4
A14 −8.1525E−4
A16 +1.5674E−4
A18 +2.0791E−4
A20 −7.2259E−5
optical path difference function B2 −2.2762E−3
B4 −1.9935E−1
B6 −1.2123E+1
B8 +1.1733E−7
B10 −1.2123E+1
3rd surface
aspherical surface coefficient

κ −4.9724E+1
A4 +1.7809E−1
A6 −2.9720E−1

TABLE 2-continued

A8 +3.2457E−1
A10 −2.9150E−1
A12 +1.6532E−1
A14 −4.0406E−2

*di denotes displacement from i$^{th}$ surface to (i + 1)$^{th}$ surface

As shown in Table 2, in the present example, the optical element of the present invention is applied to the objective. The objective is used as only for BD, and is set to have a focal distance f1=1.77 mm at the time of the wavelength $\lambda_1$=405 nm, and magnification=0.

The incidence plane (the second surface) and the exit plane (the third surface) of the objective are formed to be an aspherical surface being axial symmetry around the optical axis regulated by a formula formed by substituting the coefficients shown in Table 2 into the above-mentioned formula 2.

Moreover, the diffractive structure DOE is formed on the third surface. The diffractive structure DOE is expressed by an optical path difference added to a transmitted wave front by this structure. The optical path difference is expressed by an optical path difference function $\phi(h)$ (mm) defined by substituting the coefficients shown in Table 2 into the above-mentioned formula 3.

Incidentally, the blazed wavelength $\lambda B$ of the diffractive structure DOE is 1.0 mm.

Moreover, in the objective of the present example, each constant is set as follows: $v_{d1}$=57 and $v_{d3}$=63, and 1.1×$v_{d1}$=62.7. Consequently, it is found that the formula (3) is satisfied.

Moreover, the following constants are set as follows: $SA_2$=0.048$\lambda$ rms, $\Delta n_3/\Delta \lambda_1$=−1.468×10$^{-4}$, NA=0.850, $d_i$=0.100 (mm), and then $|(SA_2/\lambda_1^2) \cdot (\Delta n_3/\Delta t) \cdot NA^4 \cdot 2d \cdot 10^9|$=18.16. Consequently, it is known that the above-mentioned formula (4) is satisfied.

Moreover, because $\Delta fb$=152 μm and $|\Delta fb/\Delta\lambda_1|$=0.375, it is known that the above-mentioned formula (5) is satisfied.

Moreover, because the following constants are set as follows: $n_1$=1.5603, $n_3$=1.5619, $h_{max}$=3.0 mm, $\alpha$=26.28°, it is known that the above-mentioned formulas (6) and (7) are satisfied.

Second Embodiment

In the following, referring to the attached drawings, a second embodiment for implementing the present invention is described in detail.

FIG. 6 is a view schematically showing the configuration of an optical pickup device PU capable of performing information recording/reproducing adequately to any of HD (a first optical disk), DVD (a second optical disk) and CD (a third optical disk). The optical specifications of the HD are: the wavelength $\lambda_1$ thereof is 407 nm, the thickness $d_1$ of the protective layer (protective substrate) PL1 thereof is 0.6 mm, and the numerical aperture NA1 thereof is 0.65. The optical specifications of the DVD are: the wavelength $\lambda_2$ thereof is 655 nm, the thickness $d_2$ of the protective layer PL2 thereof is 0.6 mm, and the numerical aperture NA2 thereof is 0.65. The optical specifications of the CD are: the wavelength $\lambda_3$ thereof is 785 nm, the thickness $d_3$ of the protective layer PL3 thereof is 1.2 mm, and the numerical aperture NA3 thereof is 0.51.

However, the combinations of the wavelengths, the thicknesses of the protective layers and the numerical apertures are not restricted to those ones. Moreover, as the first optical disk, a BD having a protective layer PL1 having a thickness $d_1$ being about 0.1 mm may be used.

Moreover, the magnifications of the optical system of the object $m_1$ and $m_2$ at the time of performing information recording and/or reproducing to the first optical disk and the second optical disk are set to be $-\frac{1}{20} \leq m_1 \leq \frac{1}{20}$, $-\frac{1}{20} \leq m_2 \leq \frac{1}{20}$. That is, the objective OBJ in the present embodiment is configured so that the first light beam and the second light beam enter the objective OBJ as almost parallel light. However, it is not always necessary in the present invention that the magnifications of the optical system of the objective $m_1$ and $m_2$ are within the rage mentioned above.

The optical pickup device PU comprises a blue-violet laser diode $LD_1$ (first light source), which emits light at the time of performing the recording/reproducing of information to the high density optical disk HD to emit a laser beam (first light beam) of 407 nm; a photo detector PD1 for the first light beam; a light source unit LU comprising a red laser diode $LD_2$ (second light source), which emits light at the time of performing the recording/reproducing of information to a DVD to emit a laser beam (second light beam) of 655 nm, and an infrared laser diode $LD_3$ (third light source), which emits light at the time of performing the recording/reproducing of information to a CD to emit a laser beam (third light beam) of 785 nm, both being integrated to be one body; a photo detector PD2 for both of the second light beam and the third light beam; a first collimate lens COL1 which only the first light beam passes; a second collimate lens COL2 which the second light beam and the third light beam pass; an objective lens OBJ (the optical element of the present invention) including optical surfaces on which diffractive structures as phase structures are formed, both of the surfaces formed as aspherical surfaces having a function of converging laser beams on information recording surfaces $RL_1$, $RL_2$ and $RL_3$; a first beam splitter BS1; a second beam splitter BS2, a third beam splitter BS3; an iris STO; sensor lenses SEN1 and SEN2; and the like.

In the case where the recording/reproducing of information is performed to the high density optical disk HD in the optical pickup device PU, as the light ray paths are drawn by solid lines in FIG. 6, first, the blue-violet laser diode $LD_1$ is excited to emit light. A diverging light beam emitted from the blue-violet laser diode $LD_1$ passes the first beam splitter BS1, and reaches the first collimate lens COL1.

Then, the first light beam is converted to be gently converging light at the time of transmitting the first collimate lens COL1, and passes the second beam splitter BS2 and a quarter wavelength plate RE to reach the objective optical element OBJ. Then, the light becomes a spot formed on the information recording surface RL1 by the objective OBJ through the first protective layer PL1. The objective OBJ performs focusing and tracking by a two-axis actuator AC1 disposed about the objective.

A reflected light beam modulated by an information pit on the information recording surface RL1 again passes the objective OBJ, the quarter wavelength plate RE, the second beam splitter BS2 and the first collimate lens COL1, and branched by the first beam splitter BS1. Then, the light beam transmits is given astigmatism by the sensor lens SEN1 to converge on the light-receiving surface of the photo detector PD1. Thus, the information recorded on the high density optical disk HD can be read using an output signal of the photo detector PD1.

Moreover, in the case where the recording/reproducing of information is performed to the DVD, as the light ray paths are drawn by dotted lines in FIG. 6, first, the red laser diode LD2 is excited to emit light. A diverging light beam emitted from the red laser diode LD$_2$ passes the third beam splitter BS3, and reaches the second collimate lens COL2.

Then, the light beam is converted to be gently converging light at the time of transmitting the second collimate lens COL2, and is reflected by the second beam splitter BS2. And the reflected light passes the quarter wavelength plate RE to reach the objective OBJ. Then, the light becomes a spot formed on the information recording surface RL2 by the objective OBJ through the second protective layer PL2. The objective OBJ performs focusing and tracking by the two-axis actuator AC1 disposed around the objective.

Alternatively, the second light beam may be converted to gently diverging light at the time of passing the second collimate lens COL2, and may be reflected by the second beam splitter BS2 to pass the quarter wavelength plate RE for entering the objective OBJ.

A reflected light beam modulated by an information pit on the information recording surface RL2 again passes the objective OBJ and the quarter wavelength plate RE, and is reflected by the second beam splitter BS2. After that, the reflected light flux passes the second collimate lens COL2 to be branched by the third beam splitter BS3. Then, the light beam converges on the light-receiving surface of the photo detector PD2. Thus, the information recorded on the DVD can be read using an output signal of the photo detector PD2.

Moreover, in the case where the recording/reproducing of information is performed to the CD, as the light ray paths are drawn by long dashed double-short dashed lines in FIG. 6, first, the infrared laser diode LD$_3$ is excited to emit light. A diverging light beam emitted from the infrared laser diode LD$_3$ passes the third beam splitter BS3, and reaches the second collimate lens COL2.

Then, the light beam is converted to be gentle diverging light beam at the time of transmitting the second collimate lens COL2, and is reflected by the second beam splitter BS2. And the reflected light passes the quarter wavelength plate RE to reach the objective OBJ. Then, the light is turned to be a spot formed on the information recording surface RL$_3$ by the objective OBJ through the third protective layer PL3. The objective OBJ performs focusing and tracking by the two-axis actuator AC1 disposed around the objective.

A reflected light beam modulated by an information pit on the information recording surface RL$_3$ again passes the objective OBJ and the quarter wavelength plate RE, and is reflected by the second beam splitter BS2. After that, the reflected light flux passes the second collimate lens COL2 to be branched by the third beam splitter BS3. Then, the light beam converges on the light-receiving surface of the photo detector PD2. Thus, the information recorded on the CD can be read using an output signal of the photo detector PD2.

Next, the configuration of the objective OBJ is described.

The objective is a dioptric single lens made of an athermal resin. The objective is configured to be one group composed of one sheet. Both of the optical surface S1 on the light source side and the optical surface S2 on the optical disk side of the objective OBJ are severally configured to be an aspherical surface.

The athermal resin at least includes a resin as the mother material, inorganic fine particles A each having the temperature dependence of a refractive index change $\Delta n_{2A}/\Delta t$ having an opposite sign to that of the refractive index change $\Delta n_1/\Delta t$ of the mother material, and inorganic fine particles B having a wavelength dependency of a refractive index $\Delta n_{2B}/\Delta \lambda_1$ at the time when the wavelength $\lambda_1$ has changed within a range of ±10 nm which wavelength dependency is smaller than that of the refractive index $\Delta n_1/\Delta \lambda_1$ of the mother material. The athermal resin is set to satisfy the relations: $|\Delta n^3/\Delta t| \leq 8.0 \times 10^{-5}$ [° C.$^{-1}$], and $|\Delta n_3/\Delta \lambda_1| \leq 1.3 \times 10^{-4}$ [nm$^{-1}$].

Figure 7:
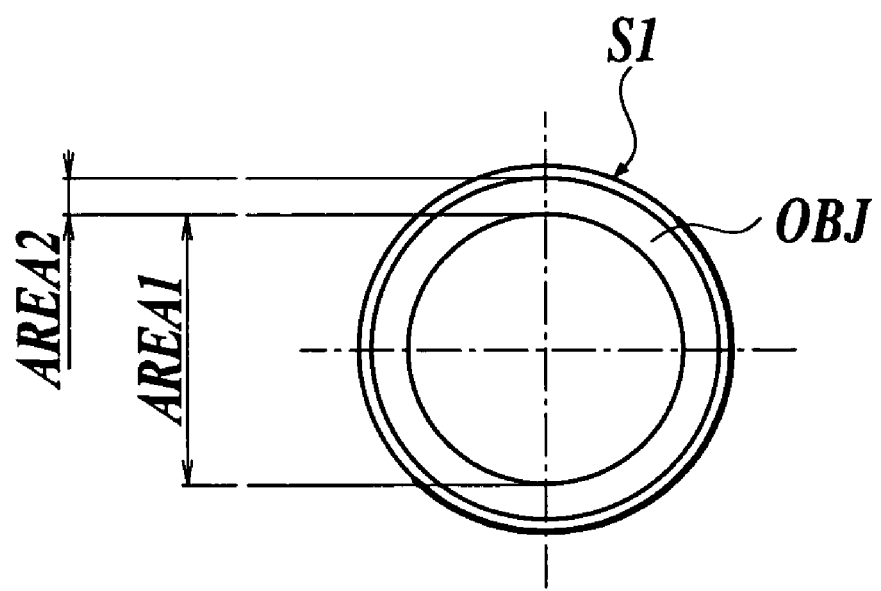
FIG. 7 is a view showing the optical surface of an objective.

An optical surface S1 of the objective OBJ is, as shown in FIG. 7, is divided into a first area AREA1 including the optical axis corresponding to the area in the NA3 and a second area AREA2 corresponding to the areas from NA3 to NA1. In the first area AREA1, as shown in FIGS. 4A and 4B, a diffractive structure HOE being a structure in which a plurality of ring surfaces, in each of which a step structure is formed, is arranged around the optical axis as the center is formed.

Incidentally, in the case where the high density optical disk is the BD, the second area AREA2 is desirably divided into the areas from NA3 to NA2.

Moreover, as an example which will be shown later, both the optical surfaces S1 and S2 may be divided. For example, the configuration bearing the division with the two optical surfaces such that the division of the first area AREA1 and the second area AREA2 is performed on the optical surface S1 and the division of the second area AREA2 and the third area AREA3 is performed on the optical surface S2 may be adoptable. Moreover, since the difference of the effective diameters between HD and DVD is small, the composition including no third area AREA3 may be adoptable.

In the diffractive structure HOE formed in the first area AREA1, the depth D of the step structure formed in each ring surface is set as a value calculated by a formula: $D \cdot (N-1)/\lambda_1 = 2 \cdot q$. N denotes the refractive index of the optical element for the light beam having wavelength $\lambda_1$. The number of divisions in each ring surface is set as 5. Incidentally, $\lambda_1$ denotes the wavelength of laser beam emitted from the first light emission point EP 1 per micron (here $\lambda_1 = 0.408$ μm), and q denotes a natural number.

In case of setting q=1 here, when the first light beam of the first wavelength $\lambda_1$ enters the step structure where the depth D in the optical axis direction has been set in such a way, an optical path difference of $2 \times \lambda_1$ (μm) is generated between adjoining step structures, and the first light beam is not substantially given a phase difference. Consequently, the first light beam transmits the step structures as it is (such a light beam is referred to as "zero order diffracted light" in the present specification).

Moreover, when the third light beam of the third wavelength $\lambda_3$ (here $\lambda_3 = 0.785$ μm) has entered the step structure, an optical path difference of $(2 \times \lambda_1/\lambda_3) \times \lambda_3$ is generated between adjoining step structures. Because the third wavelength $\lambda_3$ is almost twice as long as the first wavelength $\lambda_1$, an optical path difference of almost $1 \times \lambda_3$ (μm) is generated between adjoining step structures, and also the third light beam is not substantially given any phase differences like the first light beam. Consequently, the third light beam transmits the step structures as it is without being diffracted (zero order diffracted light).

On the other hand, when the second light beam of the second wavelength $\lambda_2$ (here $\lambda_2 = 0.658$ μm) has entered the step structure, a n optical path difference of $2 \times 0.408 \times (1.5064-1)/(1.5242-1) - 0.658 = 0.13$ (μm) is generated between the adjoining step structures. Since the number of divisions in each ring surface is set as 5, the optical path difference for one wavelength of the second wavelength $\lambda_2$ is generated mutually between the adjoining ring surfaces $(0.13 \times 5 = 0.65 \cong 1 \times 0.658)$, and it the second light beam diffracts in the +1 order direction (+1 order diffracted light). Although the diffraction efficiency of the +1 order diffracted light of the second light beam becomes 87.5%, it is a sufficient quantity of light for the recording/reproducing of information to the DVD.

The width of each ring surface of the diffractive structure HOE is set to add a predetermined spherical aberration to the +1 order diffracted light by the diffraction operation when the second light beam has entered. By canceling the spherical aberration generated by the magnification, the substrate thickness and the wavelength of the second optical disk to the magnification, the substrate thickness and the wavelength of the first optical disk by the spherical aberration added by the diffraction, the second light beam forms a good spot on the information recording surface RL2 of the DVD.

Incidentally, diffractive structures $DOE_1$ and $DOE_2$ (DOE1 corresponds to FIG. 2A and $DOE_2$ corresponds to FIG. 2B) comprising a plurality of ring surfaces the sectional form of which is a sawtooth form including the optical axis may be formed in the first area AREA1 and the second area AREA2 of the optical surface S1 of the objective OBJ.

In this case, in the diffractive structure $DOE_1$, the distance D of steps in the optical axis direction is set in order that the diffraction efficiency of the $8^{th}$ order diffracted light may be 100% to the wavelength 407 nm (the refractive index of the optical element on which the diffractive structure DOE is formed to the wavelength 407 nm is 1.559806). When the second light beam (the refractive index of the optical element on which the diffractive structure DOE is formed to the wavelength 655 nm is 1.540725) enters the diffractive structure DOE1 the depth of whose steps has been set in such a way, $+5^{th}$ order diffracted light is generated at the diffraction efficiency of 87.7%. When the third light beam (the refractive index of the optical element on which the diffractive structure DOE is formed to the wavelength 785 nm is 1.537237) enters the diffractive structure DOE1, $+4^{th}$ order diffracted light is generated at the diffraction efficiency of 99.9%. Consequently, sufficient diffraction efficiency can be obtained in any wavelength area.

On the other hand, in the case where the similar distance D of the steps in the optical axis direction is set also in the diffractive structure $DOE_2$, the respective diffracted light to the first, the second and the third light beam has the same diffraction efficiencies.

Like the present embodiment, the wavelength (blazed wavelength) of the light in which the diffraction efficiency is 100% is not $\lambda_1$, and the diffraction efficiency to the wavelength $\lambda_2$ can be heightened by shifting the wavelength a little from the wavelength $\lambda_1$. Consequently, it is also possible to maintain the balance of diffract efficiency to the light of each wavelength.

Moreover, as for the objective OBJ of the present embodiment, the sine condition is satisfied mainly to the high density optical disk having a narrow tolerance of performance. Consequently, in case of using a high density optical disk, even in the case where gently converging light enters the objective OBJ, comatic aberration produced by the tracking of the objective OBJ is hardly a problem. Moreover, in a CD, since principally the thickness of the protective layer and the magnification of the optical system thereof are different from those of the high density optical disk significantly, the sine condition is not satisfied. But, since the magnification is small among the magnification and the sign condition to be a principal factor of the generation of comatic aberration at the time of tracking of the objective OBJ, the comatic aberration is one at a level sufficiently capable of using for recording and reproducing.

Incidentally, in the case where the comatic aberration at the tracking is further wanted to be corrected, a comatic aberration correcting element may be provided in the light source side of the objective OBJ, or a collimate lens or a coupling lens having a correcting function may be provided.

The second collimate lens COL2 is a comatic aberration correcting element which has the function to reduce this comatic aberration. The second collimate lens COL2 is designed as follows. That is, in the effective diameter which the third light beam passes in the state where the luminous point of the infrared laser diode $LD_3$ is located on the optical axis of the objective OBJ, the spherical aberration is corrected in order that the spherical aberration may become below a diffraction limit. And, on the outside of the effective diameter, the spherical aberration is generated into the overcorrection direction.

Thereby, when the objective OBJ performs tracking, since the third light beam passes through the area designed in order to have big spherical aberration, comatic aberration is added to the third light beam which has transmitted the second collimate lens COL2 and the objective OBJ. The direction and the size of the spherical aberration on the outside of the effective diameter of the second collimate lens COL2 are determined in order that this comatic aberration and the comatic aberration resulting from the fact that the infrared laser diode $LD_3$ is located at an off-axis object point may be offset.

Incidentally, the following configuration may be adopted also. That is, by performing the tilt drive of the objective OBJ in synchronization with the tracking of the objective OBJ, the comatic aberration generated by the tracking of the objective OBJ and the comatic aberration generated by the tilt drive are offset. As a method of performing the tilt drive of the objective OBJ, the configuration in which the comatic aberration generated at the tracking of the objective OBJ and the comatic aberration generated at the tilt drive are offset by performing the tilt drive with three-axis actuator may be adopted.

Moreover, the configuration for making the tracking characteristic of the objective OBJ to the CD good by driving the second collimate lens COL2 into the direction perpendicular to the optical axis with a two-axis actuator in synchronization with the tracking of the objective OBJ may be adopted.

Moreover, the following configuration may be adopted. That is, an aperture limiting device AP is disposed in the neighborhood of the optical surface S1 of the objective OBJ as an aperture device for performing the aperture limiting corresponding to the NA3, and an integral tracking drive of the aperture limiting device AP and the objective OBJ is performed by an two-axis actuator.

A wavelength selecting filter WF which has the wavelength selectivity of a transmission factor is formed on the optical surface of the aperture limiting device AP in this case. The wavelength selecting filter WF has the following wavelength selectivity of transmission factors. That is, in the area in NA3, the wavelength selecting filter WF transmits all of the wavelengths of from the first wavelength $\lambda_1$ to the third wavelength $\lambda_3$. In the area in from NA3 to NA1, the wavelength selecting filter WF only blocks the third wavelength $\lambda_3$ and transmits the first wavelength $\lambda_1$ and the second wavelength $\lambda_2$. Consequently, by such a wavelength selectivity, the aperture limiting corresponding to NA3 can be performed.

Moreover, since the diffractive structure HOE is formed in the first area AREA1 corresponding to the NA2, the second light beam which passes through the second area AREA2 serves as a flare component which does not contribute to the spot formation on the information recording surface RL2 of the DVD. This fact is equivalent to that the objective OBJ has the aperture limiting function to the NA2, and the aperture limiting corresponding to the NA2 is performed by this function.

Moreover, as the limiting method of an aperture, the system which changes an iris mechanically, or the system using a liquid crystal phase control device LCD, which will be described later, may be adopted in addition to the method of using the wavelength selecting filter WF.

As mentioned above, in the objective OBJ and the optical pickup device PU which have been shown in the present embodiment, as the material of the objective OBJ, an athermal resin including at least a resin as a mother material, inorganic fine particles A having a temperature dependency of a refractive index $\Delta n_{2A}/\Delta t$ to be an opposite sign of the refractive index change $\Delta n_1/\Delta t$ of the mother material, and inorganic fine particles B having a wavelength dependency of the refractive index $\Delta n_{2B}/\Delta \lambda_1$ smaller than a wavelength dependency of the refractive index $\Delta n_1/\Delta \lambda_1$ of the mother material when the wavelength $\lambda_1$ has changed within a range of $\pm 10$ nm is used. The athermal resin is set in order that formulas $|\Delta n_3/\Delta t| \leq 8.0 \times 10^{-5}$ [° C.$^{-1}$] and $|\Delta n^3/\Delta \lambda_1| \leq 1.3 \times 10^{-4}$ [nm$^{-1}$] may be satisfied. Thereby, the quantity of the variations of the refractive index accompanying temperature changes can be reduced with the formability of the plastic material being held, and though the objective is a single lens of a high NA, the spherical aberration changes by refractive index changes can be suppressed to be small.

Using the phase structure provided on the objective, for example, the spherical aberration in the case where the wavelength of a laser diode has changed owing to temperature changes can be suppressed, the spherical aberration in the case where a laser diode having an oscillated wavelength shifted from a reference wavelength owing to a manufacturing error is used is suppressed, or a good recording/reproducing characteristic can be maintained even if the wavelength of an incident light beam has instantaneously changed owing to a mode hopping of a laser.

EXAMPLE

Next, the example of the optical element shown in the embodiment above is described.

The lens data of an example 3 is shown in Table 3.

TABLE 3

Example 3 lens data

| focal length of objective lens | f1 = 2.20 mm | f2 = 2.11 mm | f3 = 2.88 |
|---|---|---|---|
| image-surface side numerical aperture | NA1: 0.85 | NA2: 0.60 | NA3: 0.48 |
| two-surface diffraction order | n1: 0 | n2: 1 | n3: 0 |
| three-surface diffraction order | n1: 0 | n2: 0 | n3: 1 |
| magnification | m1.0 | m2.0 | m3: 0 |

| i-th surface | ri | di (408 nm) | ni (408 nm) | di (658 nm) |
|---|---|---|---|---|
| 0 | | ∞ | | ∞ |
| 1 | ∞ | 0.01 | | 0.01 |
| (stop size) | | (φ3.74 mm) | | (φ3.74 mm) |
| 2 | 1.38713 | 2.60000 | 1.51401 | 2.60000 |
| 2' | 1.38713 | 0.00000 | 1.51401 | 0.00000 |
| 3 | −2.22550 | 0.75 | 1.0 | 0.25 |
| 3' | −2.22550 | 0.00 | | 0.00 |
| 4 | ∞ | 0.0875 | 1.618294 | 0.6 |
| 5 | ∞ | | | |

| i-th surface | ni (658 nm) | di (785 nm) | ni (785 nm) |
|---|---|---|---|
| 0 | | ∞ | |
| 1 | | 0.01 | |

TABLE 3-continued

| (stop size) | | (φ3.74 mm) | |
|---|---|---|---|
| 2 | 1.505092 | 2.60000 | 1.503502 |
| 2' | 1.505092 | 0.00000 | 1.503502 |
| 3 | 1.0 | 0.31 | 1.0 |
| 3' | | 0.00 | |
| 4 | 1.577315 | 1.2 | 1.57063 |
| 5 | | | | aspherical surface data

2nd surface (0 < h ≤ 1.42 mm)
aspherical surface coefficient

κ −6.3760E−1
A4 +5.7425E−3
A6 +2.2772E−3
A8 −1.9656E−4
A10 +8.2943E−5
A12 +3.2729E−5
A14 +1.4392E−5
A16 −3.4779E−6
A18 −5.2975E−6
A20 +1.6180E−6 optical path difference function

B2 −3.1348E+1
B4 −4.9980
B6 −1.7649E−1
B8 −2.7002E−1
B10 −2.5123E−3

2'nd surface (1.42 mm < h: area dedicated for BD
aspherical surface coefficient

κ −6.3760E−1
A4 +5.7425E−3
A6 +2.2772E−3
A8 −1.9656E−4
A10 +8.2943E−5
A12 +3.2729E−5
A14 +1.4392E−5
A16 −3.4779E−6
A18 −5.2975E−6
A20 +1.6180E−6

3rd surface
(0 < h ≤ 0.686 mm: area shared by BD/DVD/CD)
aspherical surface coefficient κ −2.2369E+1
A4 +1.2106E−1
A6 −1.3813E−1
A8 +9.2530E−2
A10 −3.0395E−2
A12 +3.8513E−3 optical path difference function

B2 +1.7083E+2
B4 −2.6963E+2
B6 +4.0360E+2
B8 −4.5672E+2
B10 +2.4520E+2

3'rd surface (0.686 mm < h)
aspherical surface coefficient

κ −2.2369E+1
A4 +1.2106E−1
A6 −1.3813E−1
A8 +9.2530E−2
A10 −3.0395E−2
A12 +3.8513E−3

*di denotes displacement from i$^{th}$ surface to (i + 1)$^{th}$ surface
*d2' and d3' denote displacements from 2nd surface to 2'nd surface and from 3rd surface to 3'rd surface, respectively As shown in Table 3, in the present example, the optical element of the present invention is applied to the objective. This objective is used as an object compatible with BD, DVD and CD, and is set to have a focal distance $f_1$=2.20 mm and a magnification $m_1$=0 at the time of a wavelength $\lambda_1$=408 nm, a focal distance $f_2$=2.11 mm and a magnification $m_2$=0 at the time of a wavelength $\lambda_2$=658 nm, and a focal distance $f_3$=2.88 mm and magnification $m_3$=0 at the time of a wavelength $\lambda_3$=785 nm.

The incidence plane of the objective is divided into a 2nd surface having a height on the optical axis as the center of 0 mm<h$\leq$1.42 mm, and a 2' nd surface (area dedicated for BD) having a height of 1.42 mm<h. Moreover, the exit plane of the object is divided into a 3rd surface having a height on the optical axis as the center of 0 mm<h$\leq$0.686 mm (area shared by BD, DVD and CD), and a 3' rd surface having a height of 0.686 mm<h.

Moreover, the 2nd surface, the 2' nd surface, the 3rd surface, and the 3' rd surface are severally formed to an aspherical surface which is axial symmetry around the optical axis and is regulated by a formula expressed by substituting the coefficients shown in Table 3 for the following Formula 2.

$$x = \frac{h^2/r}{1+\sqrt{1-(1+\kappa)(h/r)^2}} + \sum_{i=2} A_{2i}h^{2i} \quad \text{[Formula 2]}$$

Here, a letter x denotes an axis in the optical axis direction (supposed that the advancing direction of light is positive), a letter k denotes a cone coefficient, and a letter $A_{2i}$ denotes an aspherical surface coefficient.

Moreover, the diffractive structure DOE is formed on the 2nd surface and the 3rd surface. The diffractive structure DOE is expressed by an optical path difference added to a transmitted wave front by the structure. The optical path difference is expressed by an optical path difference function $\phi(h)$ (mm) defined by substituting the coefficients shown Table 3 for the following Formula 3, $$\text{optical path difference function } \Phi(h) = \left(\sum_{i=0}^{5} B_{2i}h^{2i}\right) \times n \times \frac{\lambda}{\lambda B} \quad \text{[Formula 3]}$$

where h (mm) denotes a height in the direction perpendicular to the optical axis, $B_{2i}$ denotes an optical path difference function coefficient, n denotes the diffraction order of diffracted light having the maximum diffraction efficiency in the diffracted light of an incident light beam, $\lambda_1$ (nm) denotes the wavelength of a light beam entering the diffractive structure, $\lambda_1 B$ (nm) denotes a manufacturing wavelength of the diffractive structure.

Incidentally, the blazed wavelength $\lambda_1 B$ of the diffractive structure DOE is 1.0 mm.

Incidentally, without being limited to the embodiments mentioned above, in the range which does not depart from the sprit and the scope of the present invention, various improvements and the modifications of design may be performed.

Incidentally, all disclosures including the specifications, claims, drawings and abstracts of Japanese Patent Application No. 2004-126519 filed Apr. 22, 2004, and Japenese Patent Application No. 2004-133543 filed Apr. 28, 2004 are incorporated in a part of the present application as they are.

What is claimed is:

1. An optical pickup device comprising a first light source emitting a first light beam having a wavelength $\lambda_1$ within a range of from 390 nm to 420 nm and at least one optical element, the optical pickup device being capable of performing recording and/or reproducing of information of a first optical disk having a protective substrate thickness $d_1$ mm using the first light beam from the first light source, wherein the optical element is made of a mixed material produced by dispersing particles into a resin, a sign of a refractive index change $\Delta n_2/\Delta t$ of the particles owing to a temperature change is opposite to a sign of a refractive index change $\Delta n_1/\Delta t$ of the resin owing to a temperature change, or an absolute value of the refractive index change $\Delta n_2/\Delta t$ is smaller than an absolute value of the refractive index change $\Delta n_1/\Delta t$, and a spherical aberration $SA_1$ [$\lambda$ rms] produced when an operating temperature of the optical pickup device rises by 30° C. satisfies a following relation, $$|(SA_1/\lambda_1^2)\cdot(\Delta n_3/\Delta t)\cdot NA^4\cdot 2d_1\cdot 10^9| \leq 9.9$$

where $SA_1$ denotes a sum of squares of a third order spherical aberration, a fifth order spherical aberration and a seventh order spherical aberration, $\Delta n_3/\Delta t$ denotes the refractive index change owing to the temperature change of the mixed material, and NA denotes a numerical aperture on an exit side of an optical element located nearest to an optical disk side among optical elements which the optical pickup device contains.

2. The optical pickup device of claim 1, wherein a following relation is satisfied, $$|(\Delta n_1/\Delta t)| \geq 2\cdot|(\Delta n_3/\Delta t)|.$$

3. The optical pickup device of claim 1, wherein the sign of $\Delta n_2/\Delta t$ is opposite to the sign of $\Delta n_1/\Delta t$.

4. The optical pickup device of claim 1, wherein an average particle diameter of the particles in the mixed material is 50 nm or less.

5. The optical pickup device of claim 1, wherein the optical element is composed of a single lens.

6. An optical pickup device comprising a first light source emitting a first light beam having a wavelength $\lambda_1$ within a range of from 390 nm to 420 nm and at least one optical element, the optical pickup device being capable of performing recording and/or reproducing of information of a first optical disk having a protective substrate thickness $d_1$ mm using the first light beam from the first light source, wherein the optical element is made of a mixed material produced by dispersing particles into a resin, and a sign of a refractive index change $\Delta n_2/\Delta\lambda_1$ of the particles owing to a wavelength change is opposite to a refractive index change $\Delta n_1/\Delta\lambda_1$ of the resin owing to a wavelength change, or an absolute value of the refractive index change $\Delta n_2/\Delta\lambda_1$ is smaller than an absolute value of the refractive index change $\Delta n_1/\Delta\lambda_1$.

7. The optical pickup device of claim 6, wherein an Abbe number $v_{d3}$ on a d line of the mixed material satisfies a following relation, $$1.1 v_{d1} \leq v_{d3}$$

where $v_{d1}$ denotes an Abbe number on the d line of the resin, $v_{d1}$ and $v_{d3}$ are both obtained from $v_d=(n_d-1)/(n_F-n_c)$, $n_d$ denotes the refractive index of the resin on the d line, $n_F$ denotes a refractive index on an F line of the resin, and $n_c$ denotes a refractive index on a C line of the resin.

8. The optical pickup device of claim 6, wherein a spherical aberration $SA_2$ [λ rms] produced when the wavelength of the first light beam from the first light source is changed by ±5 nm from $\lambda_1$ satisfies a following relation, $$|(SA_2/\lambda_1^2) \cdot (\Delta n_3/\Delta \lambda_1) \cdot NA^4 \cdot 2d_1 \cdot 10^9| \leq 18.5$$

where $SA_2$ denotes a sum of squares of a third order spherical aberration, a fifth order spherical aberration and a seventh order spherical aberration, $\Delta n_3/\Delta \lambda_1$ denotes the refractive index change by the wavelength change of the mixed material, and NA denotes a numerical aperture on an exit side of an optical element located nearest to an optical disk side among optical elements which the optical pickup device contains.

9. The optical pickup device of claim 6, wherein a positionally changed minimum quantity of wavefront aberration Δfb [μm] in an optical axis direction of a converged spot formed on an information recording surface of the first optical disk when the wavelength of the first light beam from the first light source has changed from $\lambda_1$ by ±1 nm satisfies a following relation, $$|\Delta fb/\Delta \lambda 1| \leq 0.4.$$

10. The optical pickup device of claim 6, wherein following relations are satisfied, $$n_1 < n_3$$

$$26.0° \leq \alpha$$

where $n_1$ and $n_3$ denote refractive indices of the resin and the mixed material, respectively, to the first light beam of the wavelength $\lambda_1$, $h_{max}$ denotes a maximum effective diameter of an optical surface on a light source side of the optical element, and a denotes an angle formed by a tangential line at the maximum effective diameter $h_{max}$ of the optical surface and an optical axis.

11. An optical pickup device comprising a first light source emitting a first light beam having a wavelength $\lambda_1$ within a range of from 390 nm to 420 nm and at least one optical element, the optical pickup device being capable of performing recording and/or reproducing of information of a first optical disk having a protective substrate thickness $d_1$ mm using the first light beam from the first light source, wherein the optical element is made of a mixed material produced by dispersing particles into a resin, the particles contain particles A and particles B, a sign of a refractive index change $\Delta n_{2A}/\Delta t$ of the particles A owing to a temperature change is opposite to a sign of a refractive index change $\Delta n_1/\Delta t$ of the resin owing to a temperature change, or an absolute value of the refractive index change $\Delta n_{2A}/\Delta t$ is smaller than an absolute value of the refractive index change $\Delta n_1/\Delta t$, and a sign of a refractive index change $\Delta n_{2B}/\Delta \lambda_1$ owing to a wavelength change of the particles B is opposite to a sign of a refractive index change $\Delta n_1/\Delta \lambda_1$ by a wavelength change of the resin, or an absolute value of the refractive index change $\Delta n_{2B}/\Delta \lambda_1$ is smaller than an absolute value of the refractive index change $\Delta n_1/\Delta \lambda_1$.

12. The optical pickup device of claim 11, wherein the particles A and the particles B are mutually different particles.

13. The optical pickup device of claim 11, wherein the particles A and the particles B are the same particles.

14. The optical pickup device of claim 11, wherein a spherical aberration $SA_1$ [λ rms] produced when an operating temperature of the optical pickup device has risen by 30° C. satisfies a following relation, $$|(SA_1/\lambda_1^2) \cdot (\Delta n_3/\Delta t) \cdot NA^4 \cdot 2d_1 \cdot 10^9| \leq 9.9$$

where $SA_1$ denotes a sum of squares of a third order spherical aberration, a fifth order spherical aberration and a seventh order spherical aberration, $\Delta n_3/\Delta t$ denotes the refractive index change owing to the temperature change of the mixed material, and NA denotes a numerical aperture on an exit side of an optical element located nearest to an optical disk side among optical elements which the optical pickup device contains.

15. The optical pickup device of claim 11, wherein a following relation is satisfied, $$|(\Delta n_1/\Delta t)| \geq 2 \cdot |(\Delta n_3/\Delta t)|.$$

16. The optical pickup device of claim 11, wherein the sign of $\Delta n_{2A}/\Delta t$ is opposite to the sign of $\Delta n_1/\Delta t$.

17. The optical pickup device of claim 11, wherein an Abbe number $v_{d3}$ on a d line of the mixed material satisfies a following relation, $$1.1 \cdot v_{d1} \leq v_{d3}$$

where $v_{d1}$ denotes an Abbe number on the d line of the resin, $v_{d1}$ and $v_{d3}$ are both obtained from $v_d = (n_d - 1)/(n_F - n_c)$, $n_d$ denotes the refractive index of the resin on the d line, $n_F$ denotes a refractive index on an F line of the resin, and $n_c$ denotes a refractive index on a C line of the resin.

18. The optical pickup device of claim 17, wherein a spherical aberration $SA_2$ [λ rms] produced when the wavelength of the first light beam from the first light source is changed by ±5 nm from $\lambda_1$ satisfies a following relation, $$|(SA_2/\lambda_1^2) \cdot (\Delta n_3/\Delta \lambda_1) \cdot NA^4 \cdot 2d_1 \cdot 10^9| \leq 18.5$$

where $SA_2$ denotes a sum of squares of a third order spherical aberration, a fifth order spherical aberration and a seventh order spherical aberration, $\Delta n_3/\Delta \lambda_1$ denotes the refractive index change by the wavelength change of the mixed material, and NA denotes a numerical aperture on an exit side of an optical element located nearest to an optical disk side among optical elements which the optical pickup device contains.

19. The optical pickup device of claim 17, wherein a positionally changed minimum quantity of wavefront aberration Δfb [μm] in an optical axis direction of a converged spot formed on an information recording surface of the first optical disk when the wavelength of the first light beam from the first light source has changed from $\lambda_1$ by ±1 nm satisfies a following relation, $$|\Delta fb/\Delta \lambda 1| \leq 0.4.$$

20. An optical element to be used for an optical pickup device for performing recording and/or reproducing of information of a first optical disk having a protective substrate thickness $d_1$ mm using a first light beam having a wavelength $\lambda_1$ within a range of from 390 nm to 420 nm, the first light beam being emitted from a first light source, wherein the optical element is made of a mixed material produced by dispersing particles into a resin, a sign of a refractive index change $\Delta n_2/\Delta t$ of the particles owing to a temperature change is opposite to a sign of a refractive index change $\Delta n_1/\Delta t$ of the resin owing to a temperature change, or an absolute value of the refractive index change $\Delta n_2/\Delta t$ is smaller than an absolute value of the refractive index change $\Delta n_1/\Delta t$, and a spherical aberration $SA_1$ [λ rms] produced when an operating temperature of the optical pickup device rises by 30° C. satisfies a following relation, $$|(SA_1/\lambda_1^2)\cdot(\Delta n_3/\Delta t)\cdot NA^4 \cdot 2d_1 \cdot 10^9| \leq 9.9$$

where $SA_1$ denotes a sum of squares of a third order spherical aberration, a fifth order spherical aberration and a seventh order spherical aberration, $\Delta n_3/\Delta t$ denotes the refractive index change owing to the temperature change of the mixed material, and NA denotes a numerical aperture on an exit side of an optical element located nearest to an optical disk side among optical elements which the optical pickup device contains.

21. An optical element to be used for an optical pickup device for performing recording and/or reproducing of information of a first optical disk having a protective substrate thickness $d_1$ mm using a first light beam having a wavelength $\lambda_1$ within a range of from 390 nm to 420 nm, the first light beam being emitted from a first light source, wherein
  the optical element is made of a mixed material produced by dispersing particles into a resin, and
  a sign of a refractive index change $\Delta n_2/\Delta\lambda_1$ of the particles owing to a wavelength change is opposite to a refractive index change $\Delta n_1/\Delta\lambda_1$ of the resin owing to a wavelength change, or an absolute value of the refractive index change $\Delta n_2/\Delta\lambda_1$ is smaller than an absolute value of the refractive index change $\Delta n_1/\Delta\lambda_1$.

22. An optical element to be used for an optical pickup device for performing recording and/or reproducing of information of a first optical disk having a protective substrate thickness $d_1$ mm using a first light beam having a wavelength $\lambda_1$ within a range of from 390 nm to 420 nm, the first light beam being emitted from a first light source, wherein
  the optical element is made of a mixed material produced by dispersing particles into a resin,
  the particles contain particles A and particles B,
  a sign of a refractive index change $\Delta n_{2A}/\Delta t$ of the particles A owing to a temperature change is opposite to a sign of a refractive index change $\Delta n_1/\Delta t$ of the resin owing to a temperature change, or an absolute value of the refractive index change $\Delta n_{2A}/\Delta t$ is smaller than an absolute value of the refractive index change $\Delta n_1/\Delta t$, and
  a sign of a refractive index change $\Delta n_{2B}/\Delta\lambda_1$ of the particles B owing to a wavelength change is opposite to a sign of a refractive index change $\Delta n_1/\Delta\lambda_1$ owing to a wavelength change of the resin, or an absolute value of the refractive index change $\Delta n_{2B}/\Delta\lambda_1$ is smaller than an absolute value of the refractive index change $\Delta n_1/\Delta\lambda_1$.

23. An optical pickup device comprising a first light source emitting a first light beam having a wavelength $\lambda_1$ within a range of from 390 nm to 420 nm, a second light source emitting a second light beam having a wavelength $\lambda_2$ within a range of from $1.5\times\lambda_1$ to $1.7\times\lambda_1$, and at least one optical element, the optical pickup device being capable of performing recording and/or reproducing of information of a first optical disk having a protective substrate thickness $d_1$ mm using the first light beam from the first light source, and of performing recording and/or reproducing of information of a second optical disk having a protective substrate thickness $d_2$ mm ($0.8\times d_1 \leq d_2$) using the second light beam from the second light source, wherein
  the first light beam and the second light beam pass the optical element,
  the optical element is made of a mixed material produced by dispersing particles into a resin,
  a sign of a refractive index change $\Delta n_2/\Delta t$ of the particles owing to a temperature change is opposite to a sign of the refractive index change $\Delta n_1/\Delta t$ of the resin owing to a temperature change, or an absolute value of the refractive index change $\Delta n_2/\Delta t$ is smaller than an absolute value of a refractive index change $\Delta n_1/\Delta t$, and
  a refractive index change $\Delta n_3/\Delta t$ of the mixed material owing to a temperature change satisfies a following relation, $$|\Delta n_3/\Delta t| \leq 8.0\times10^{-5} \ [° C.^{-1}].$$

24. The optical pickup device of claim 23, wherein
  the particles contain particles A and particles B,
  a sign of a refractive index change $\Delta n_{2A}/\Delta t$ of the particles A owing to a temperature change is opposite to a sign of a refractive index change $\Delta n_1/\Delta t$ of the resin owing to a temperature change, or an absolute value of the refractive index change $\Delta n_{2A}/\Delta t$ is smaller than an absolute value of the refractive index change $\Delta n_1/\Delta t$,
  a sign of a refractive index change $\Delta n_{2B}/\Delta\lambda_1$ of the particles B owing to a wavelength change is opposite to a sign of a refractive index change $\Delta n_1/\Delta\lambda_1$ of the resin owing to a wavelength change, or an absolute value of the refractive index change $\Delta n_{2B}/\Delta\lambda_1$ is smaller than an absolute value of the refractive index change $\Delta n_1/\Delta\lambda_1$, and
  a refractive index change $\Delta n_3/\Delta\lambda_1$ of the mixed material when the wavelength of the first light beam from the first light source has changed by 10 nm from $\lambda_1$ satisfies a following relation, $$|\Delta n_3/\Delta\lambda_1| \leq 1.3\times10^{-4} \ [nm^{-1}].$$

25. The optical pickup device of claim 23, wherein the optical element is an objective.

26. The optical pickup device of claim 25, wherein a positionally changed minimum quantity of wavefront aberration $\Delta fb$ [µm] in an optical axis direction of a converged spot formed on an information recording surface of the first optical disk when the wavelength of the first light beam has changed from $\lambda_1$ satisfies a following relation:

$$|\Delta fb/\Delta\lambda_1| \leq 0.1,$$

where fb denotes a distance from the objective to the first optical disk.

27. The optical pickup device of claim 25, further comprising a phase structure provided in an area on at least one optical surface of the optical element, the area being passed by the second light beam.

28. The optical pickup device of claim 27, wherein the phase structure is a diffractive structure.

29. The optical pickup device of claim 27, wherein the first light beam transmits the phase structure without being given any phase differences substantially before being used for reproducing and/or recording information to the first optical disk.

30. The optical pickup device of claim 23, wherein a an optical system magnification $m_1$ of the optical element to the first light beam and a magnification $m_2$ of the optical system of the optical element to the second light beam satisfy following relations, $$-1/20 \leq m_1 \leq 1/20$$

$$-1/20 \leq m_2 \leq 1/20.$$

31. The optical pickup device of claim 23, wherein the optical element is a collimate lens.

32. The optical pickup device of claim 31, wherein a positionally changed minimum quantity of wavefront aberration Δfb [μm] in an optical axis direction of a converged spot formed on an information recording surface of the first optical disk when the wavelength of the first light beam has changed from $\lambda_1$ satisfies a following relation:

$$|\Delta fb/\Delta\lambda_1| \leq 0.1,$$

where fb denotes a distance from the objective to the first optical disk.

33. The optical pickup device of claim 23, wherein the first light source and the second light source are integrated in a housing by being arranged close to each other.

34. The optical pickup device of claim 23, further comprising a third light source emitting a third light beam having a wavelength $\lambda_3$ within a range of from 750 nm to 820 nm, wherein
the optical pickup device is capable of performing recording and/or reproducing information of a third optical disk having a protective substrate thickness $d_3$ mm using the third light beam from the third light source, and
the first light beam, the second light beam and the third light beam pass the optical element.

35. The optical pickup device of claim 34, wherein the second light source and the third light source are integrated by being arranged close to each other in a housing.

36. The optical pickup device of claim 34, wherein the first light source, the second light source and the third light source are integrated by being arranged close to each other in a housing.

37. The optical pickup device of claim 23, wherein an average particle diameter of the particles is 50 nm or less.

38. The optical pickup device of claim 37, wherein the average particle diameter of the particles is 40 nm or less.

39. The optical pickup device of claim 23, wherein
the particles contain particles A and particles C,
a sign of a refractive index change $\Delta n_{2A}/\Delta t$ of the particles A owing to a temperature change is opposite to a sign of a refractive index change $\Delta n_1/\Delta t$ of the resin owing to a temperature change, or an absolute value of the refractive index change $\Delta n_{2A}/\Delta t$ is smaller than an absolute value of the refractive index change $\Delta n_1/\Delta t$,
dispersion of the particles C is smaller than dispersion of the resin, and
an average particle diameter of the particles C is 40 nm or less.

40. The optical pickup device of claim 23, wherein
the particles contain particles A and particles C,
a sign of a refractive index change $\Delta n_{2A}/\Delta t$ of the particles A owing to a temperature change is opposite to a sign of a refractive index change $\Delta n_1/\Delta t$ of the resin owing to a temperature change, or an absolute value of the refractive index change $\Delta n_{2A}/\Delta t$ is smaller than an absolute value of the refractive index change $\Delta n_1/\Delta t$,
dispersion of the particles C is smaller than dispersion of the resin, and
the particles A and the particles C are the same particles.

41. The optical pickup device of claim 23, wherein a weight ratio of the particles to the resin is 50 weight percents or less.

42. The optical pickup device of claim 23, wherein
the particles contain particles A and particles C,
a sign of a refractive index change $\Delta n_{2A}/\Delta t$ of the particles A owing to a temperature change is opposite to a sign of a refractive index change $\Delta n_1/\Delta t$ of the resin owing to a temperature change, or an absolute value of the refractive index change $\Delta n_{2A}/\Delta t$ is smaller than an absolute value of the refractive index change $\Delta n_1/\Delta t$,
dispersion of the particles C is smaller than dispersion of the resin, and
a weight ratio of the particles C to the resin is 50 weight percents or less.

43. An optical element to be used for an optical pickup device for performing recording and/or reproducing information of a first optical disk having a protective substrate thickness $d_1$ mm using a first light beam having a wavelength $\lambda_1$ within a range of from 390 nm to 420 nm, performing recording and/or reproducing information of a second optical disk having a substrate thickness $d_2$ mm $(0.8 \times d_1 \leq d_2)$ using a second light beam having a wavelength $\lambda_2$ within a range of from $1.5 \times \lambda_1$ to $1.7 \times \lambda_1$, the second light beam emitted from a second light source, wherein
the first light beam and the second light beam pass the optical element,
the optical element is made of a mixed material produced by dispersing particles into a resin,
a sign of a refractive index change $\Delta n_2/\Delta t$ of the particles owing to a temperature change is opposite to a sign of a refractive index change $\Delta n_1/\Delta t$ of the resin owing to a temperature change, or an absolute value of the refractive index change $\Delta n_2/\Delta t$ is smaller than an absolute value of the refractive index change $\Delta n_1/\Delta t$, and
a refractive index change $\Delta n_3/\Delta t$ of the mixed material owing to a temperature change satisfies a following relation, $$|\Delta n_3/\Delta t| \leq 8.0 \times 10^{-5} [° C.^{-1}].$$

* * * * *